(12) United States Patent
Murase et al.

(10) Patent No.: US 8,341,365 B2
(45) Date of Patent: *Dec. 25, 2012

(54) DATA BACKUP SYSTEM AND METHOD FOR VIRTUAL INFRASTRUCTURE

(75) Inventors: Atsushi Murase, Sunnyvale, CA (US); Yasunori Kaneda, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/344,501

(22) Filed: Jan. 5, 2012

(65) Prior Publication Data

US 2012/0110289 A1     May 3, 2012

Related U.S. Application Data

(63) Continuation of application No. 12/272,649, filed on Nov. 17, 2008, now Pat. No. 8,103,842.

(51) Int. Cl.
 *G06F 12/00* (2006.01)
(52) U.S. Cl. ............ 711/162; 707/644; 707/672; 714/3; 714/6.3
(58) Field of Classification Search .................. 711/162; 707/644, 672; 714/3, 603
See application file for complete search history.

(56) References Cited

U.S. PATENT DOCUMENTS

| | | | |
|---|---|---|---|
| 7,103,619 B1 | 9/2006 | Rajpurkar et al. | |
| 8,103,842 B2 * | 1/2012 | Murase et al. | 711/162 |
| 2009/0055593 A1 | 2/2009 | Satoyama et al. | |

OTHER PUBLICATIONS

Products: Hitachi ShadowImage In-System Replication, http://www.hds.com/products/storage-software/shadowimage-in-system-replication.html, retrieved on Nov. 17, 2008.
Products: Hitachi TrueCopy Remote Replication, http://www.hds.com/products/storage-software/truecopy-remote-replication.html, retrieved on Nov. 17, 2008.
Veritas NetBackup, http://www.symantec.com/business/products/overview.jsp?pcid=psc_backup_recovery&pvid=2_1, retrieved on Nov. 17, 2008.
CommVault Products, http://www.commvault.com/products/data_protection.asp?sid=10134, retrieved on Nov. 17, 2008.
VMware Virtual Center, http://www.vmware.com/products/vi/vc/, retrieved on Nov. 17, 2008.
VMware VMotion, http://www.vmware.com/products/vi/vc/vmotion.html, retrieved on Nov. 17, 2008.
VMware Consolidated Backup, http://www.vmware.com/products/vi/consolidated_backup.html, retrieved on Nov. 17, 2008.

* cited by examiner

*Primary Examiner* — Reba I Elmore
(74) *Attorney, Agent, or Firm* — Sughrue Mion, PLLC

(57) ABSTRACT

Systems for backing up the data of an IT system by utilizing server or storage virtualization technology to create and move logical IT infrastructures dynamically. A virtualized IT system provides a server resource pool and a storage resource pool composed from multiple physical devices either within a datacenter or a globally located plurality of datacenters. The virtual server and the storage volume provisioned from those pools will be paired to form the virtual infrastructure. In other words, the virtual infrastructure becomes a logical IT environment build with the required computing and storage resources needed in order to execute specific applications. The virtual infrastructure can also be migrated within/among datacenter sites.

20 Claims, 26 Drawing Sheets

Hardware Architecture

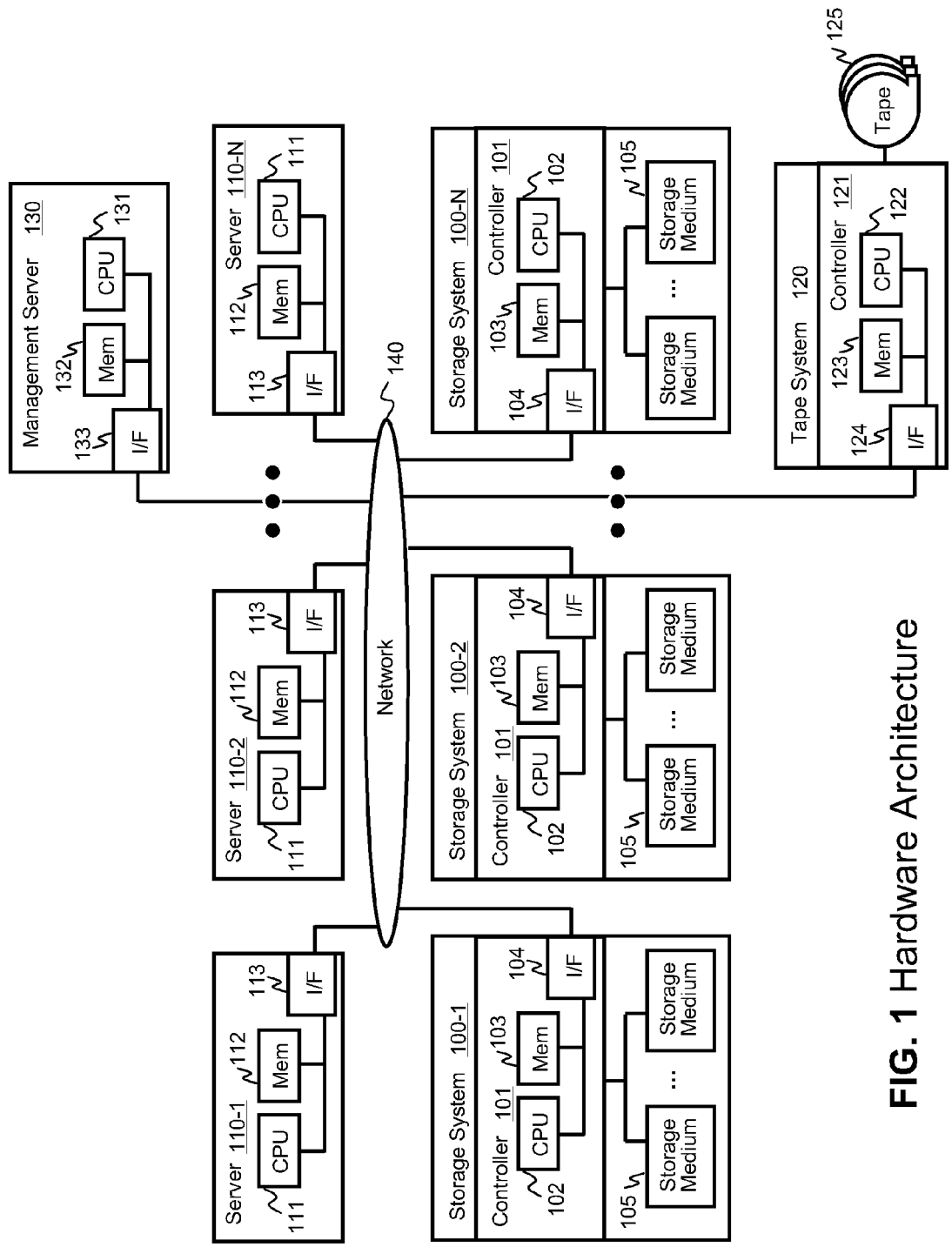
FIG. 1 Hardware Architecture

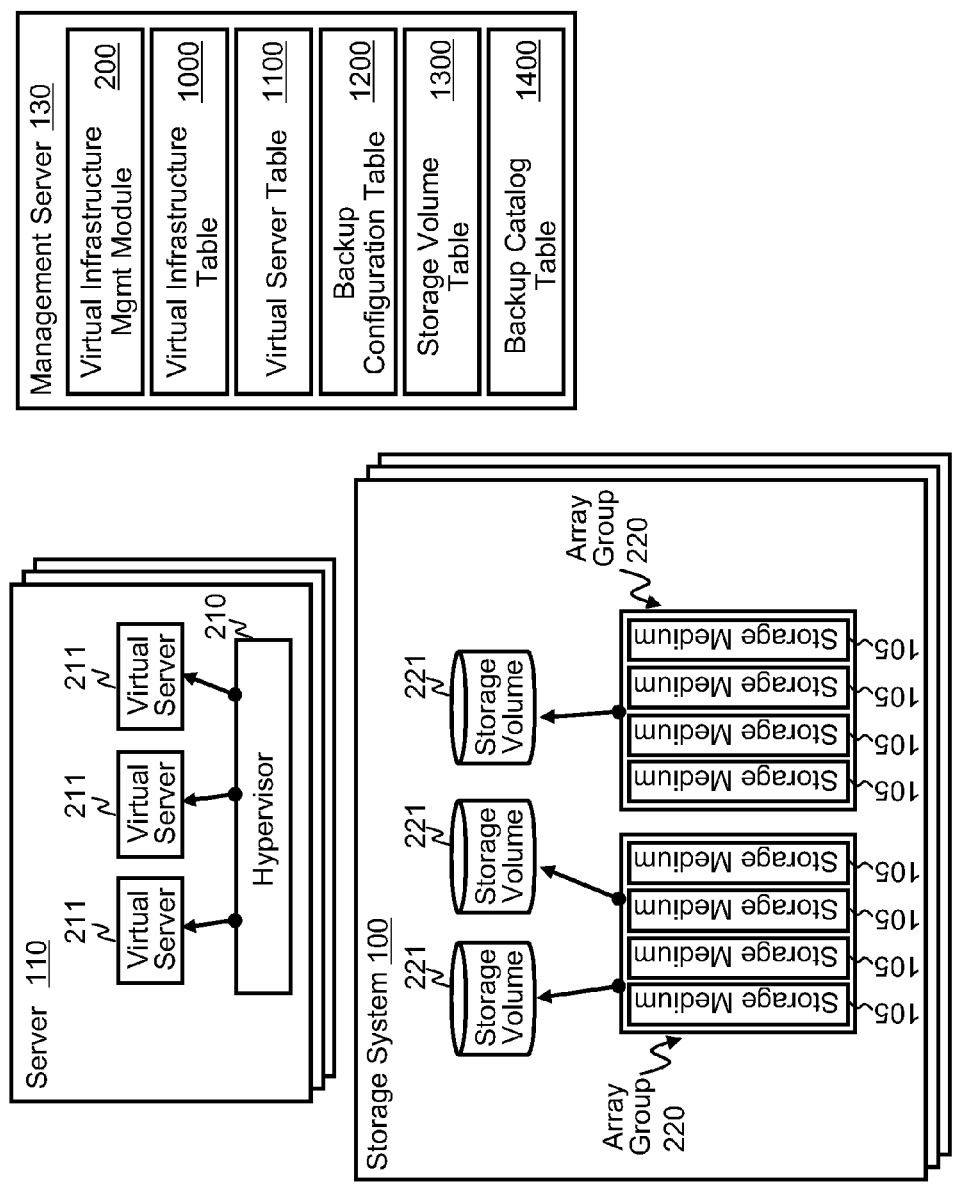
FIG. 2 Logical Element Structure

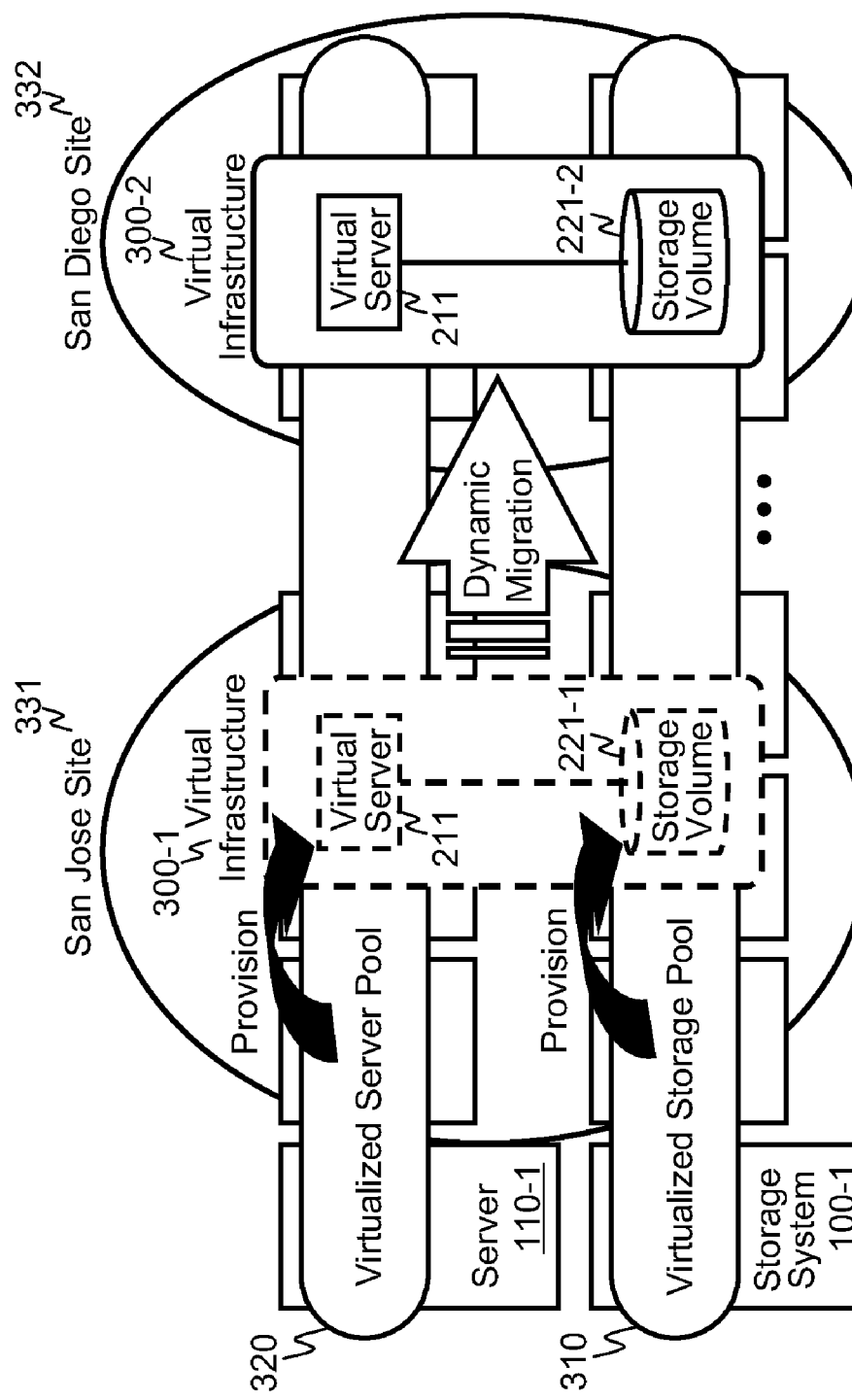
FIG. 3 Dynamic Resource Provisioning and Migration

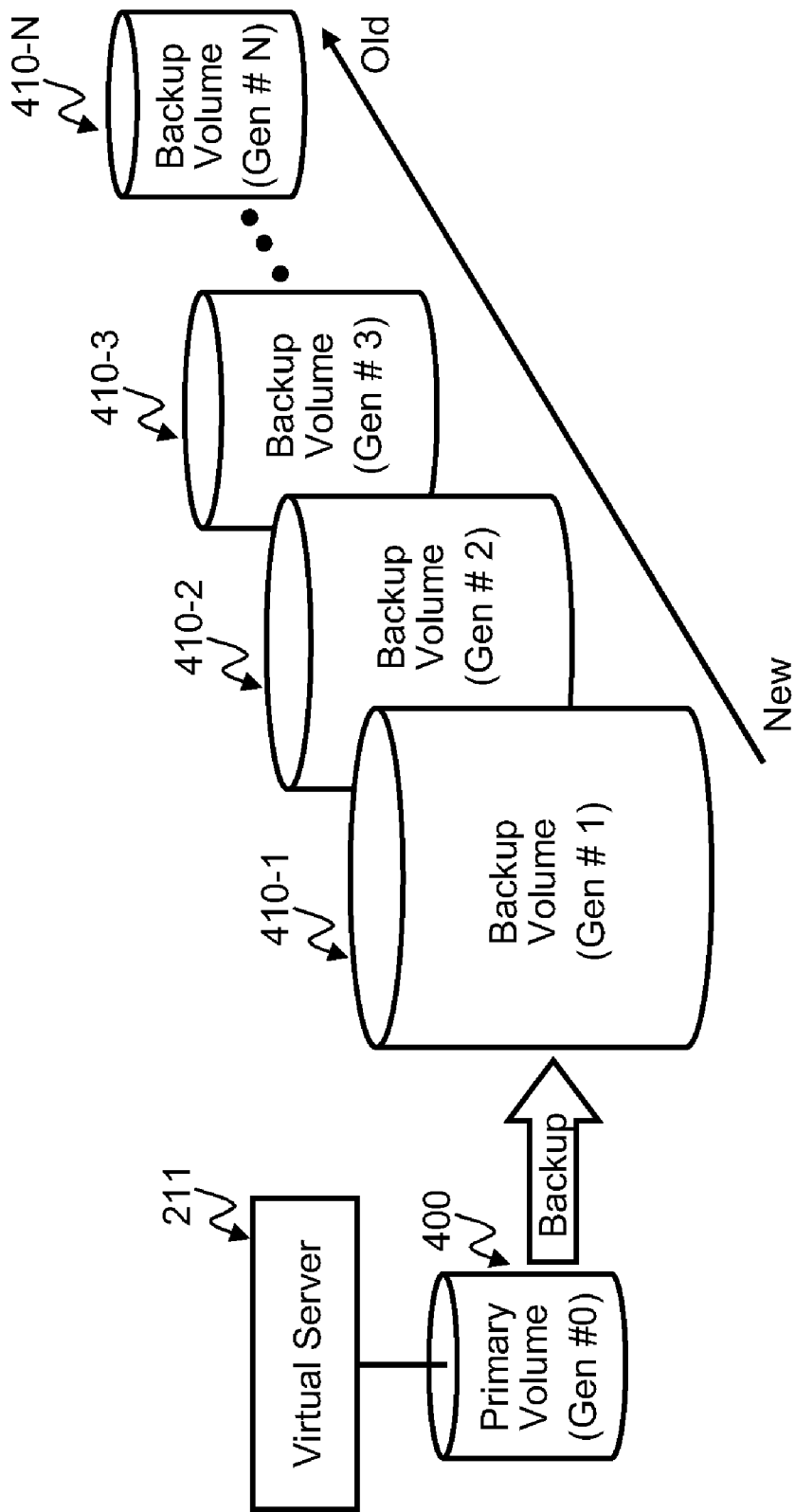
FIG. 4 Backup Generations

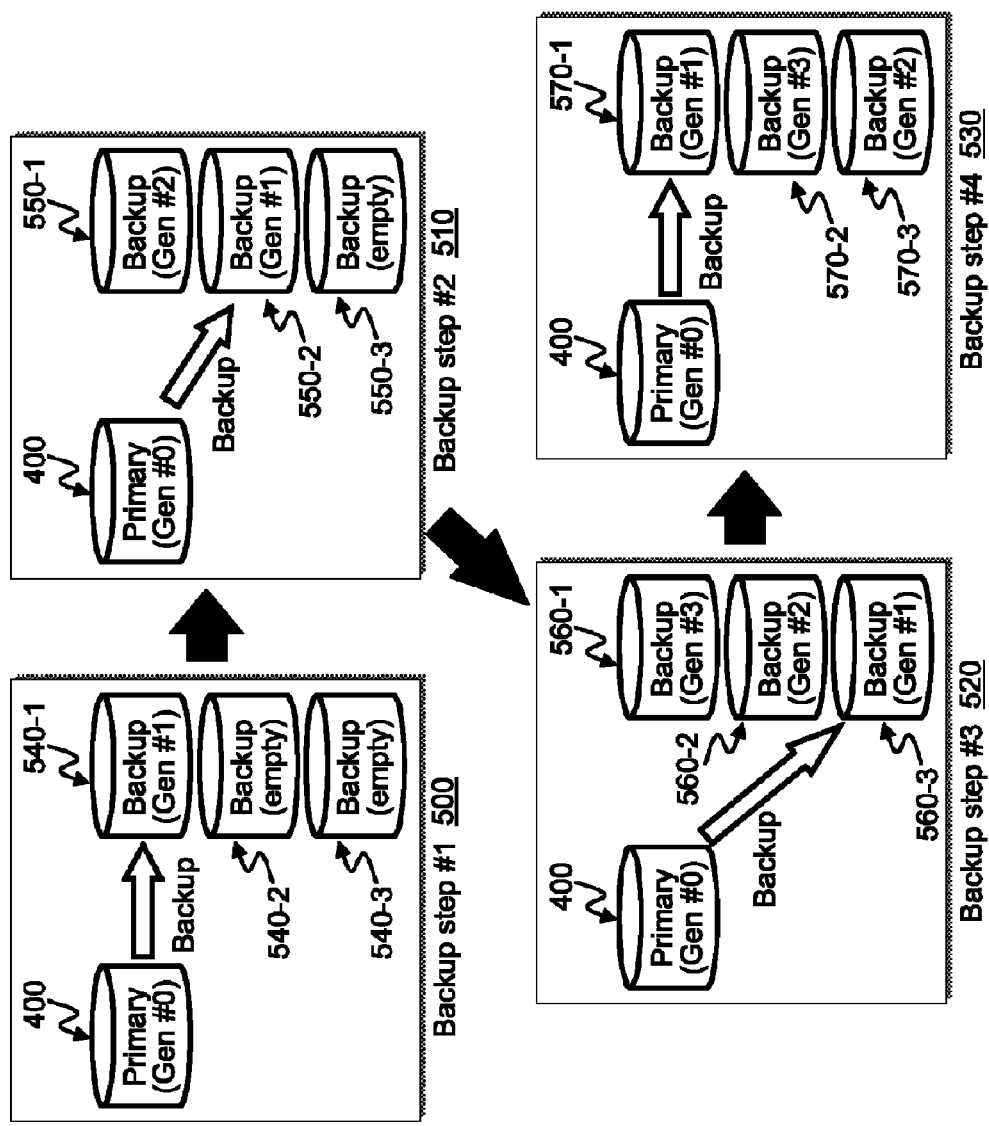
FIG. 5 Cyclic Backup Transition

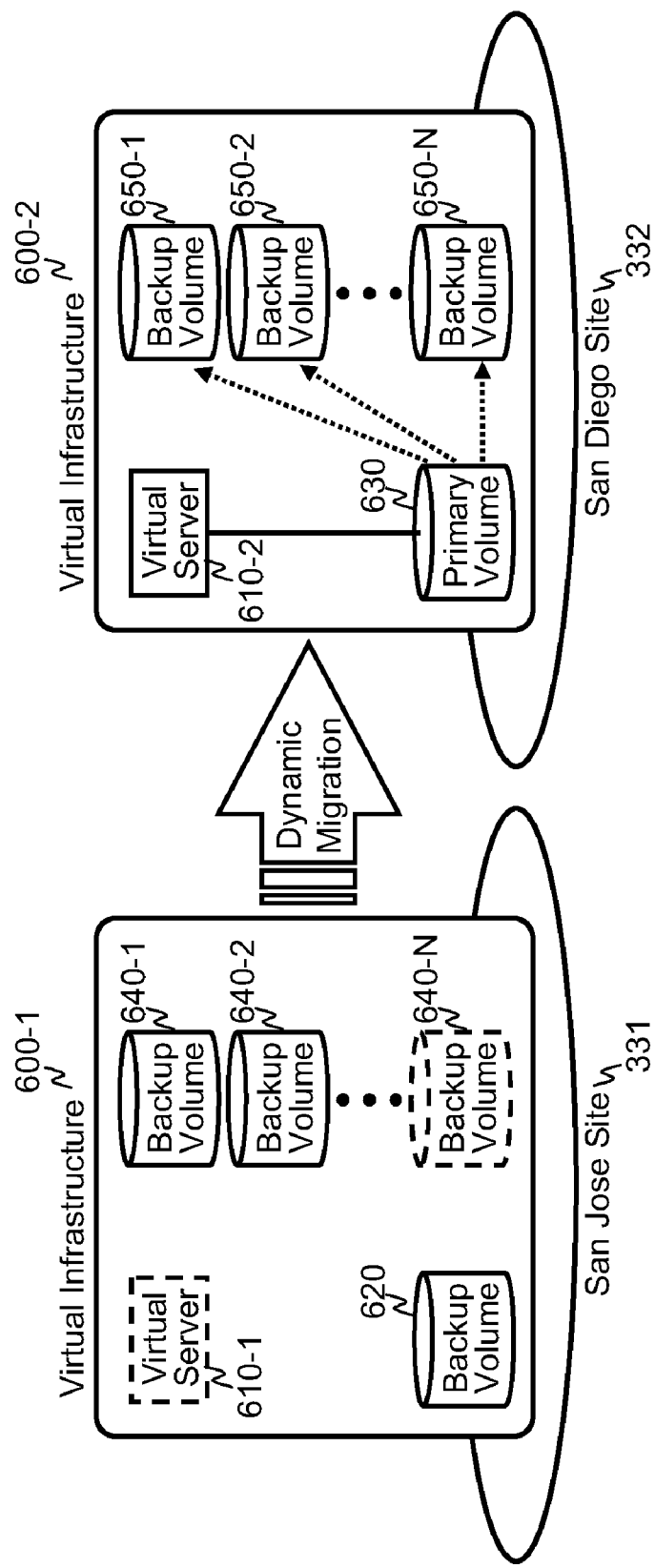
FIG. 6 Virtual Infrastructure with Backup Structure

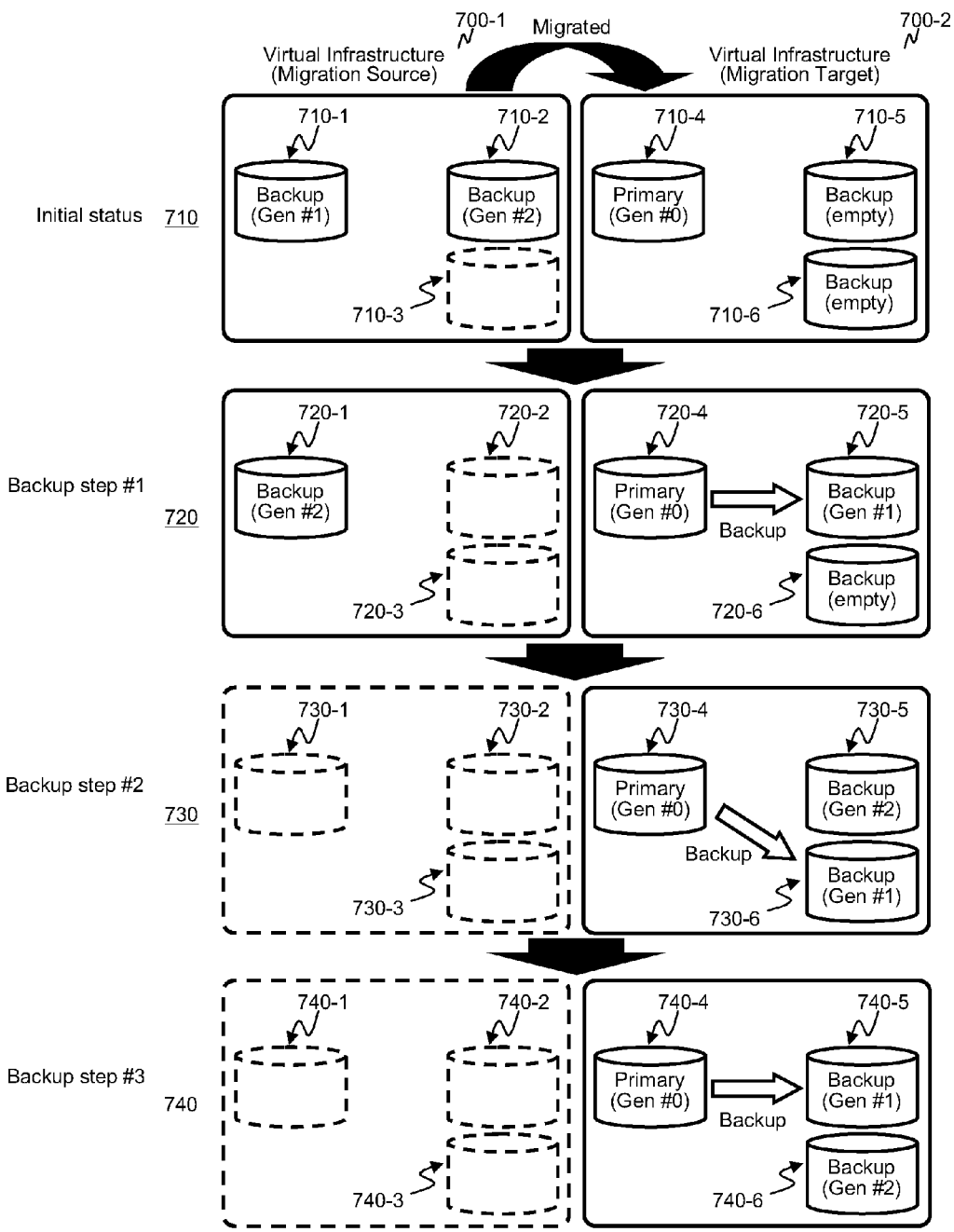
FIG. 7 Backup Volume Handling among Plural Virtual Infrastructures

| Virtual Infrastructure Key ID / 1010 | Virtual Infrastructure Representative ID / 1020 | Primary Flag / 1030 | Site Location / 1040 | Previous VIK ID / 1050 |
|---|---|---|---|---|
| VI100 | VIR1 | false | San Jose | null |
| VI101 | VIR1 | true | San Diego | VI100 |
| VI102 | VIR2 | true | San Jose | null |
| ... | ... | ... | ... | ... |

FIG. 8 Data Structure of Virtual Infrastructure Table

| Virtual Server ID | Virtual Infrastructure Key ID | Physical Server ID |
|---|---|---|
| VSrv1 | VI100 | PSrv1 |
| VSrv2 | VI101 | PSrv2 |
| VSrv3 | VI102 | PSrv1 |
| ... | ... | ... |

FIG. 9 Data Structure of Virtual Server Table

| Virtual Infrastructure Representative ID | Number of Backup Generation | Archive Method | Archive Device ID | Backup Period |
|---|---|---|---|---|
| VIR1 | 2 | Latest | TL1 | 12:00 |
| VIR2 | 3 | Latest | TL2 | 6:00 |
| VIR3 | 7 | Oldest | TL3 | 1 day |
| VIR4 | 64 | None | CS1 | 1:00 |
| ... | ... | ... | ... | ... |

FIG. 10 Data Structure of Backup Configuration Table

| | Storage Volume ID ~1310 | Virtual Infrastructure Key ID ~1320 | Storage Device ID ~1330 | Volume Type ~1340 | Next Generation Volume ID ~1350 | Backup Timestamp ~1360 |
|---|---|---|---|---|---|---|
| 1391 | Vol01 | VI100 | Strg1 | Backup | null | 2000-01-03 09:11 |
| 1392 | Vol04 | VI101 | Strg2 | Primary | null | null |
| 1393 | Vol05 | VI101 | Strg3 | Backup | Vol06 | 2000-01-03 21:11 |
| 1394 | Vol06 | VI101 | Strg3 | Backup | Vol05 | null |
| 1395 | Vol07 | VI102 | Strg4 | Primary | null | null |
| 1396 | Vol08 | VI102 | Strg5 | Backup | Vol09 | 2000-01-03 10:15 |
| 1397 | Vol09 | VI102 | Strg5 | Backup | Vol10 | 2000-01-03 16:15 |
| 1398 | Vol10 | VI102 | Strg5 | Backup | Vol08 | 2000-01-03 04:14 |
| | ... | ... | ... | ... | ... | ... |

FIG. 11 Data Structure of Storage Volume Table

| Backup ID | Virtual Infrastructure Representative ID | Backup Timestamp | Archive Timestamp | Backup Target |
|---|---|---|---|---|
| ... | ... | ... | ... | ... |
| BU024 | VIR1 | 2000-01-01 23:42 | 2000-01-02 23:00 | TL1 |
| BU025 | VIR2 | 2000-01-02 04:14 | 2000-01-02 22:00 | TL2 |
| BU026 | VIR2 | 2000-01-02 10:15 | 2000-01-03 04:00 | TL2 |
| BU027 | VIR1 | 2000-01-02 11:12 | 2000-01-03 09:00 | TL1 |
| BU028 | VIR2 | 2000-01-02 16:15 | 2000-01-03 10:00 | TL2 |
| BU029 | VIR2 | 2000-01-02 22:15 | 2000-01-03 16:00 | TL2 |
| BU030 | VIR1 | 2000-01-02 23:12 | 2000-01-03 21:00 | TL1 |
| BU031 | VIR2 | 2000-01-03 04:14 | null | Vol10 |
| BU032 | VIR1 | 2000-01-03 09:11 | null | Vol01 |
| BU033 | VIR2 | 2000-01-03 10:15 | null | Vol08 |
| BU034 | VIR2 | 2000-01-03 16:15 | null | Vol09 |
| BU035 | VIR1 | 2000-01-03 21:11 | null | Vol05 |

FIG. 12 Data Structure of Backup Catalog Table

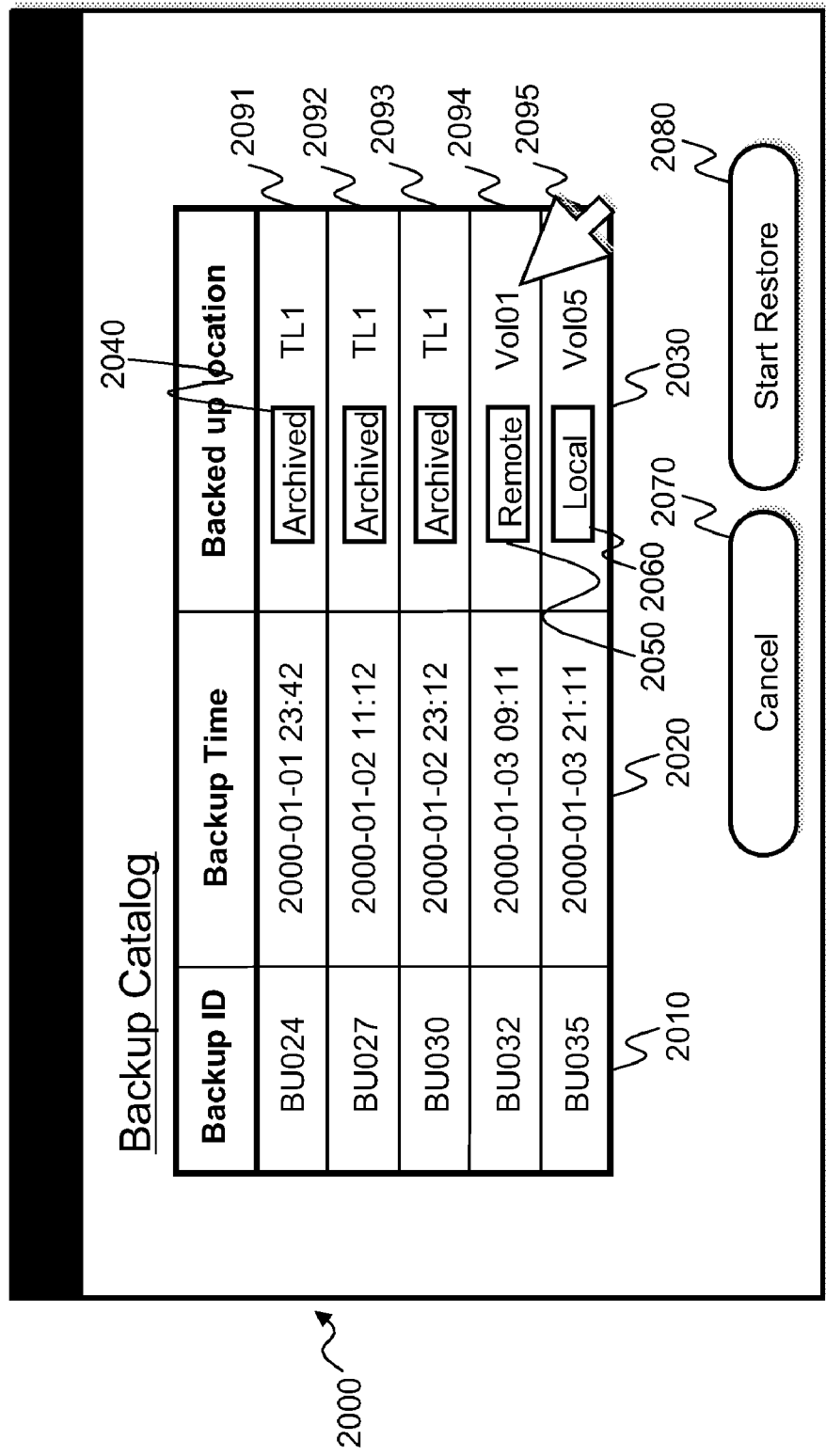
FIG. 13 User Interface for Backup Data Selection

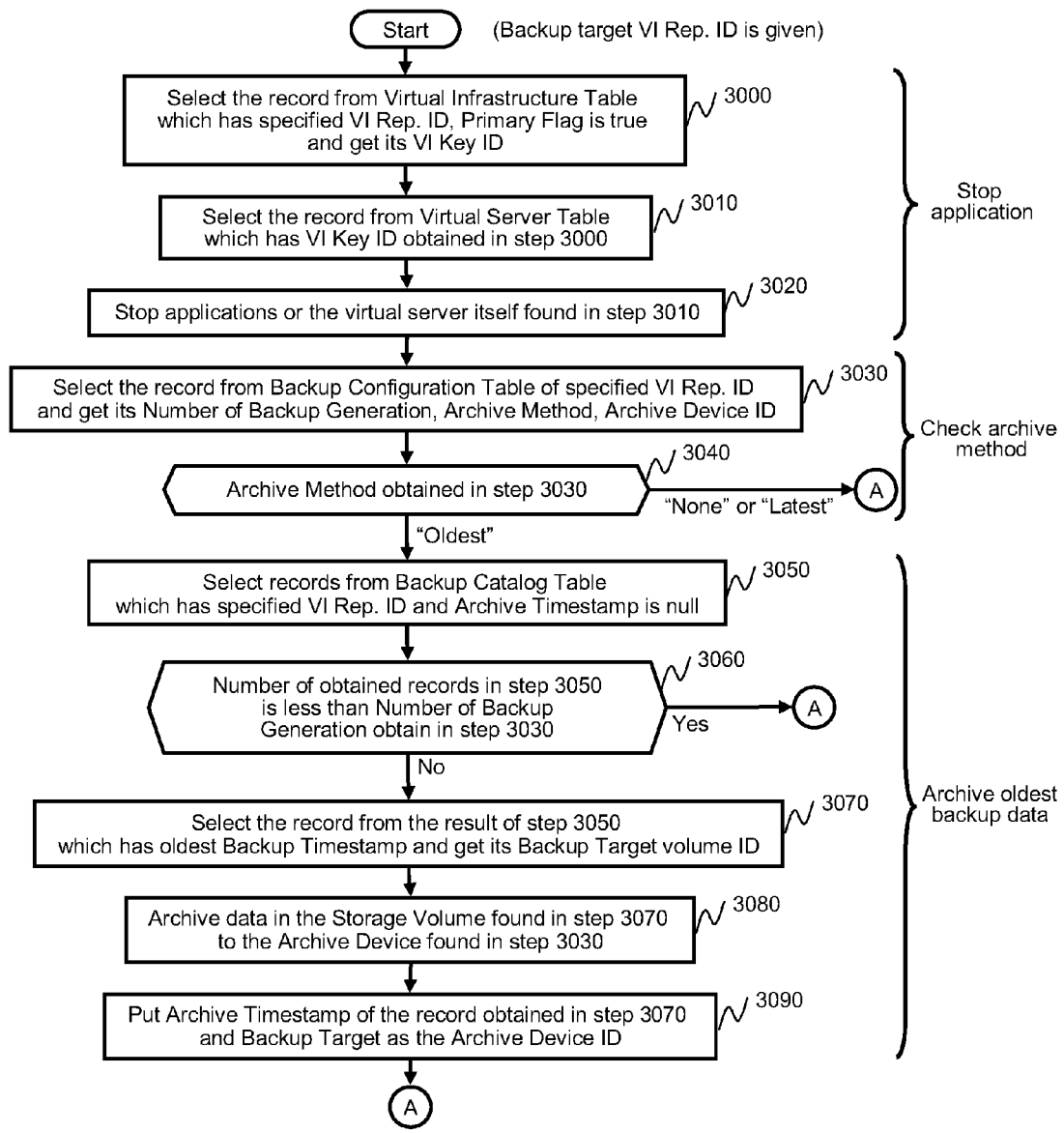
FIG. 14 Process of Backup (a)

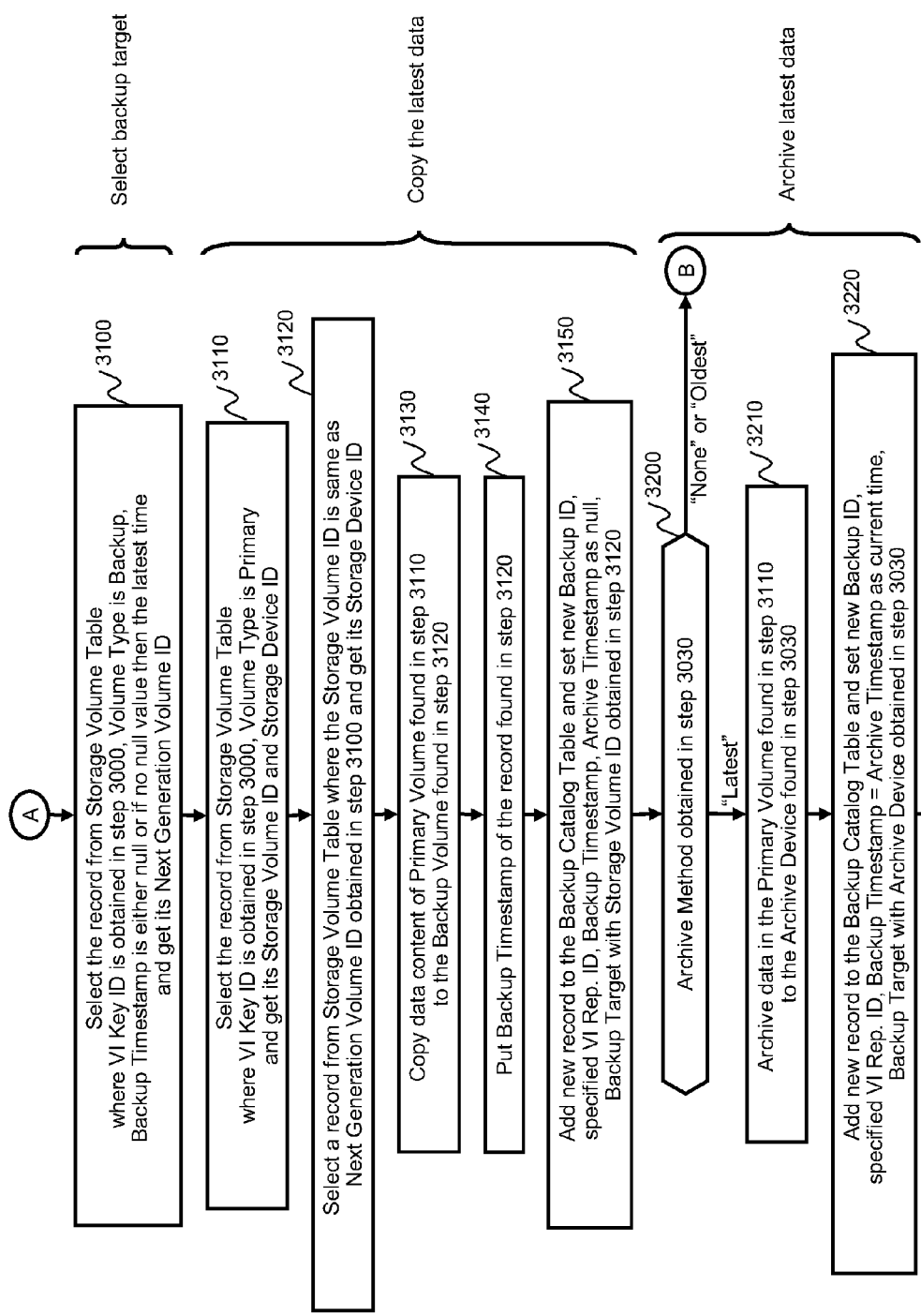
FIG. 15 Process of Backup (b)

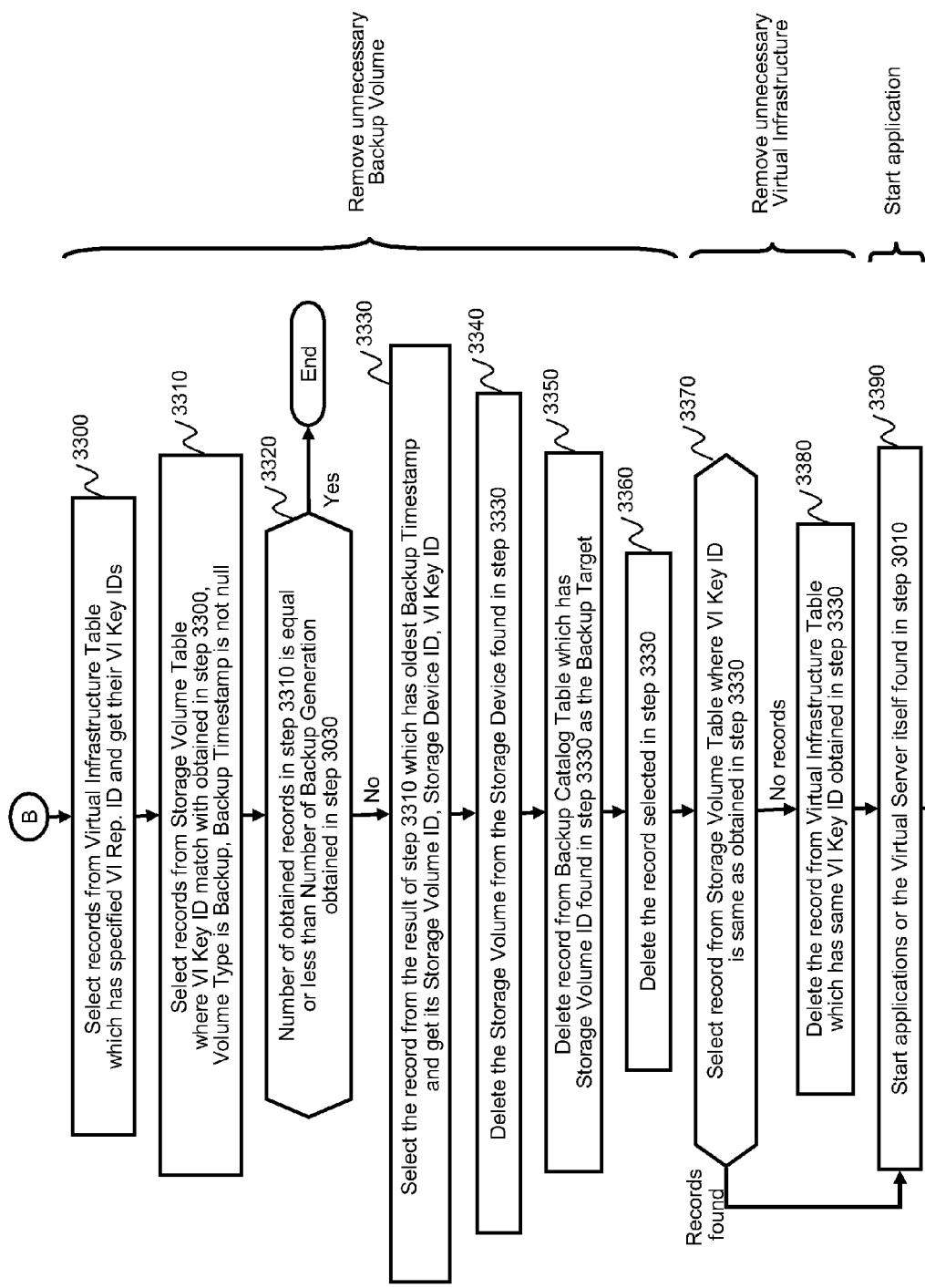
FIG. 16 Process of Backup (c)

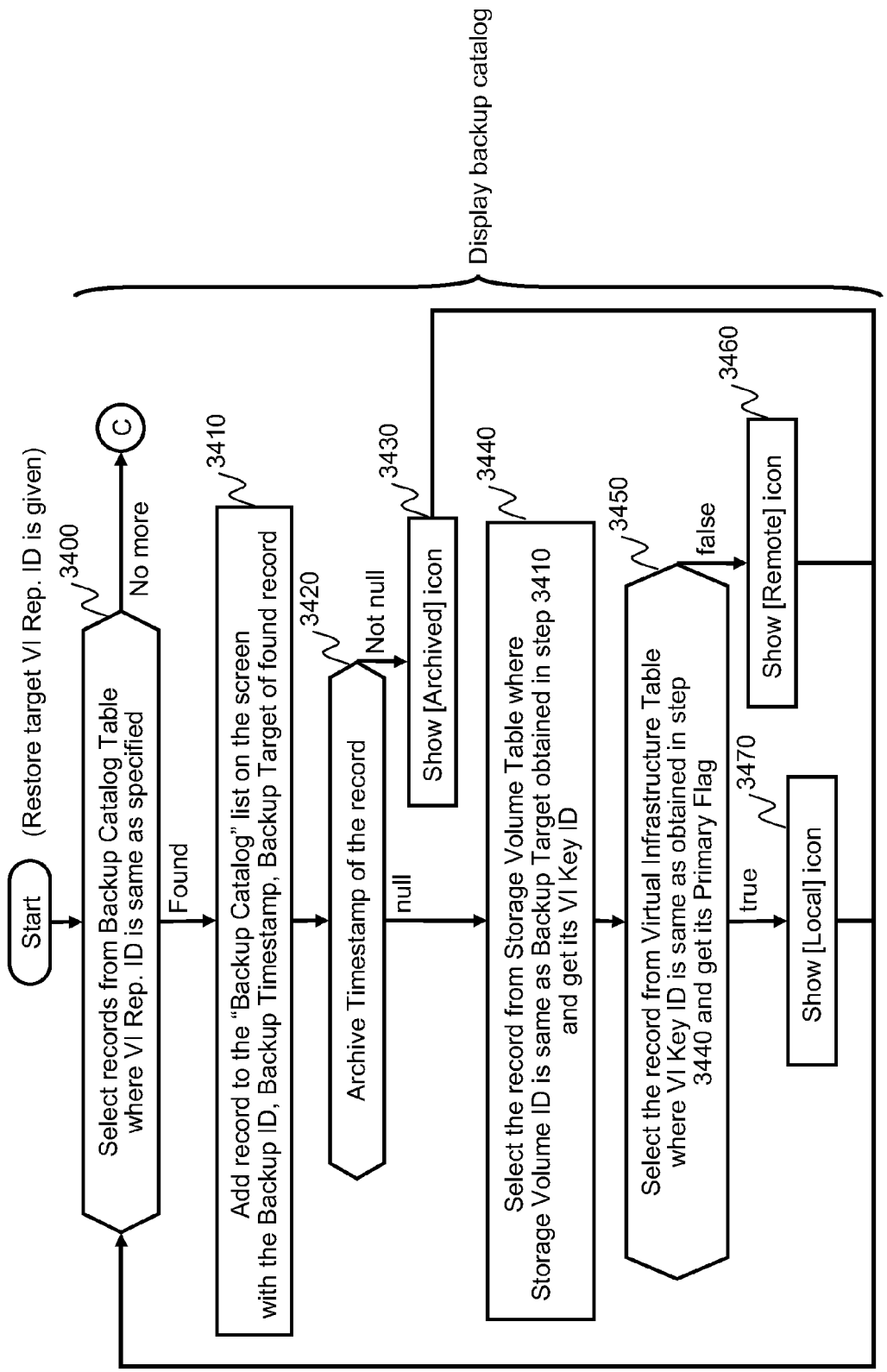
FIG. 17 Process of Restore (a)

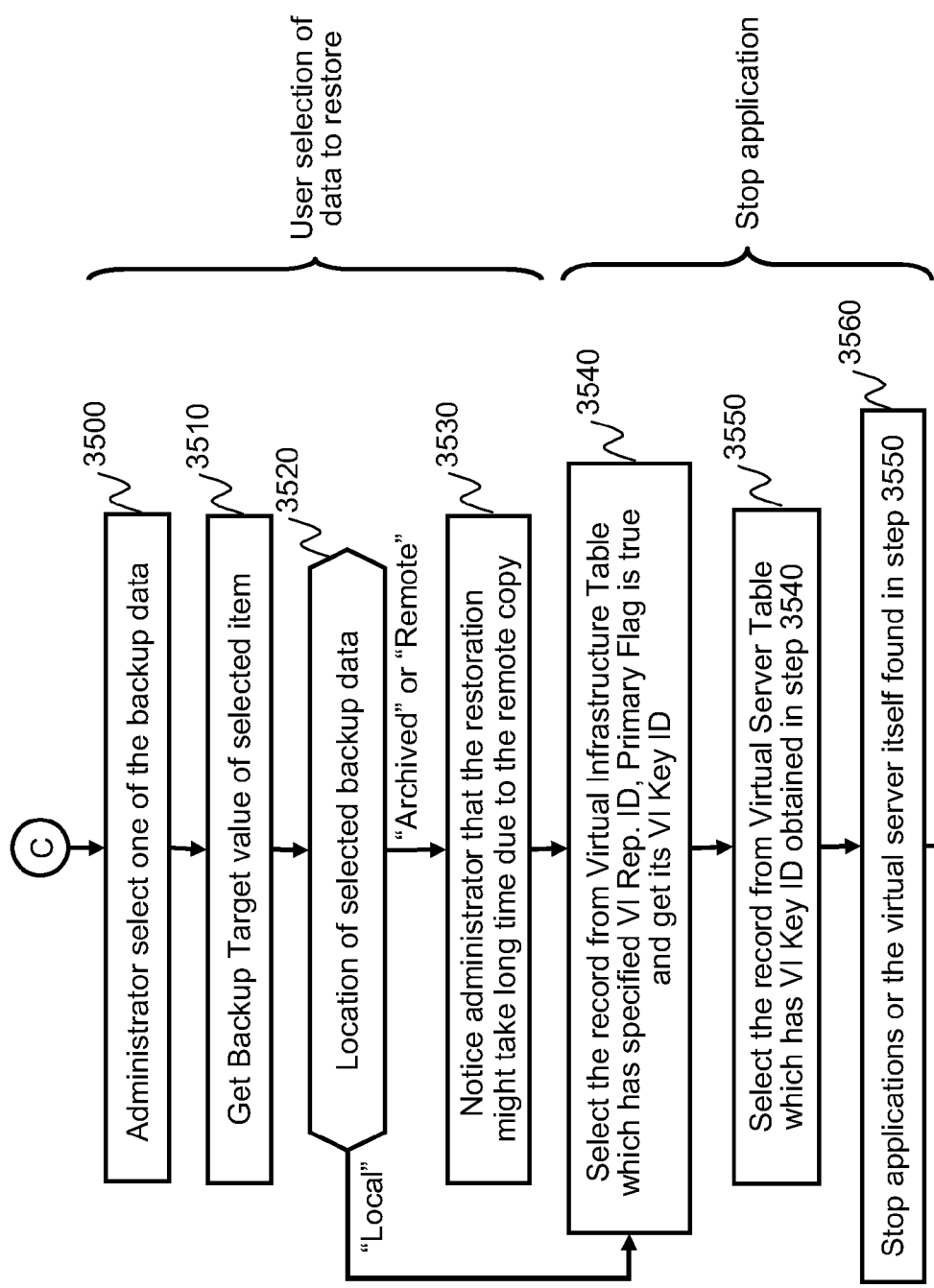
FIG. 18 Process of Restore (b)

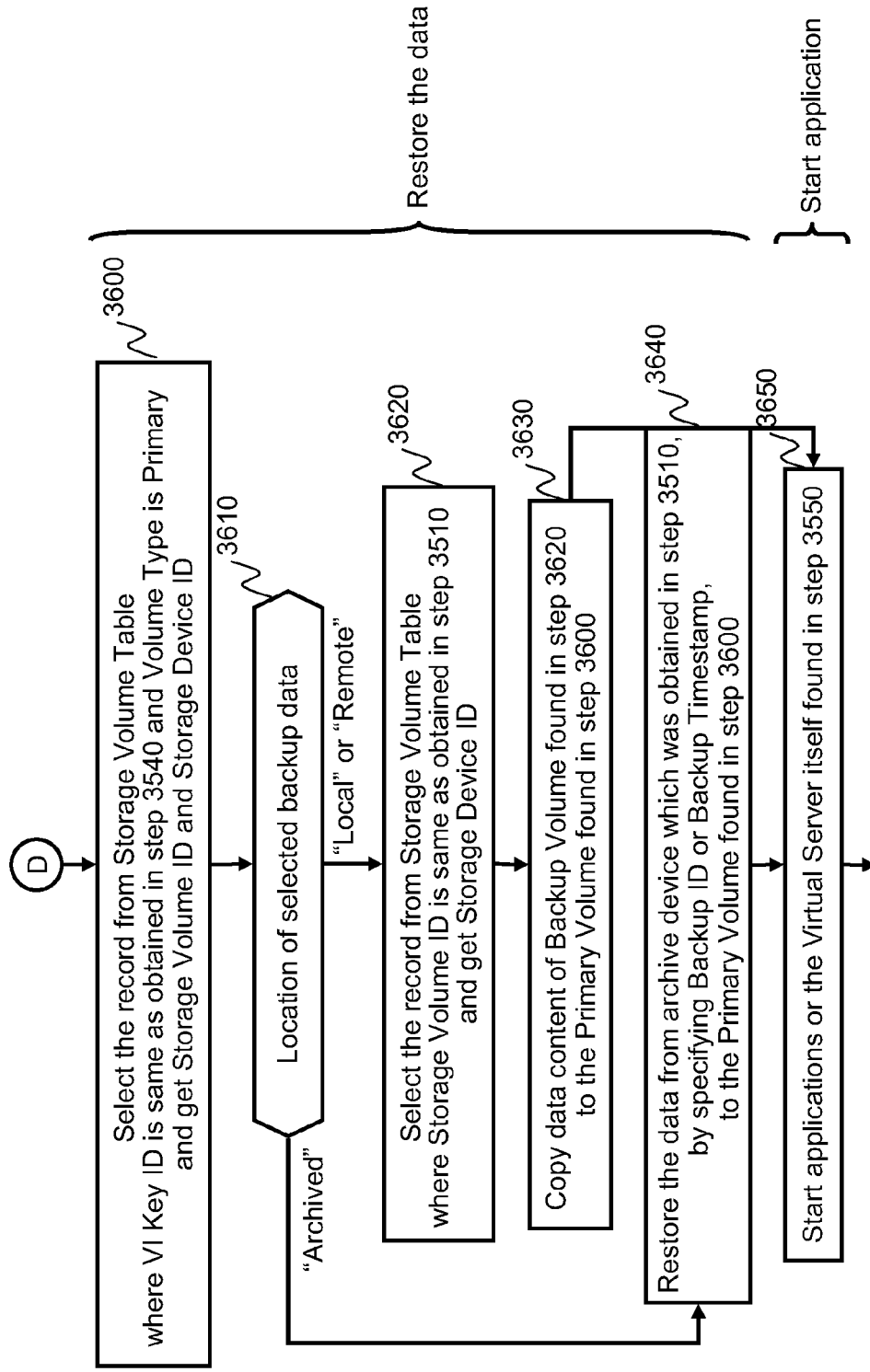
FIG. 19 Process of Restore (c)

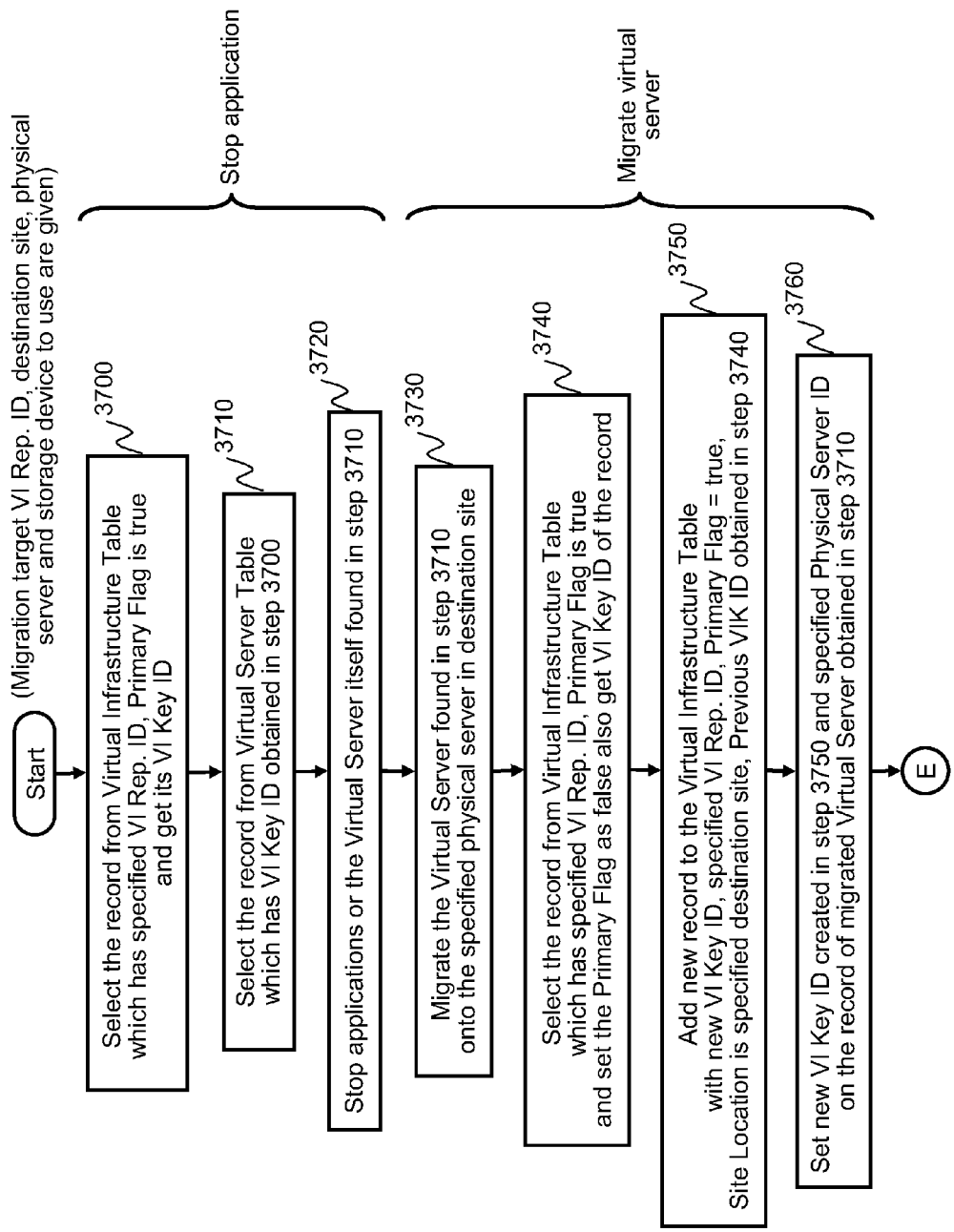
FIG. 20 Process of Migration (a)

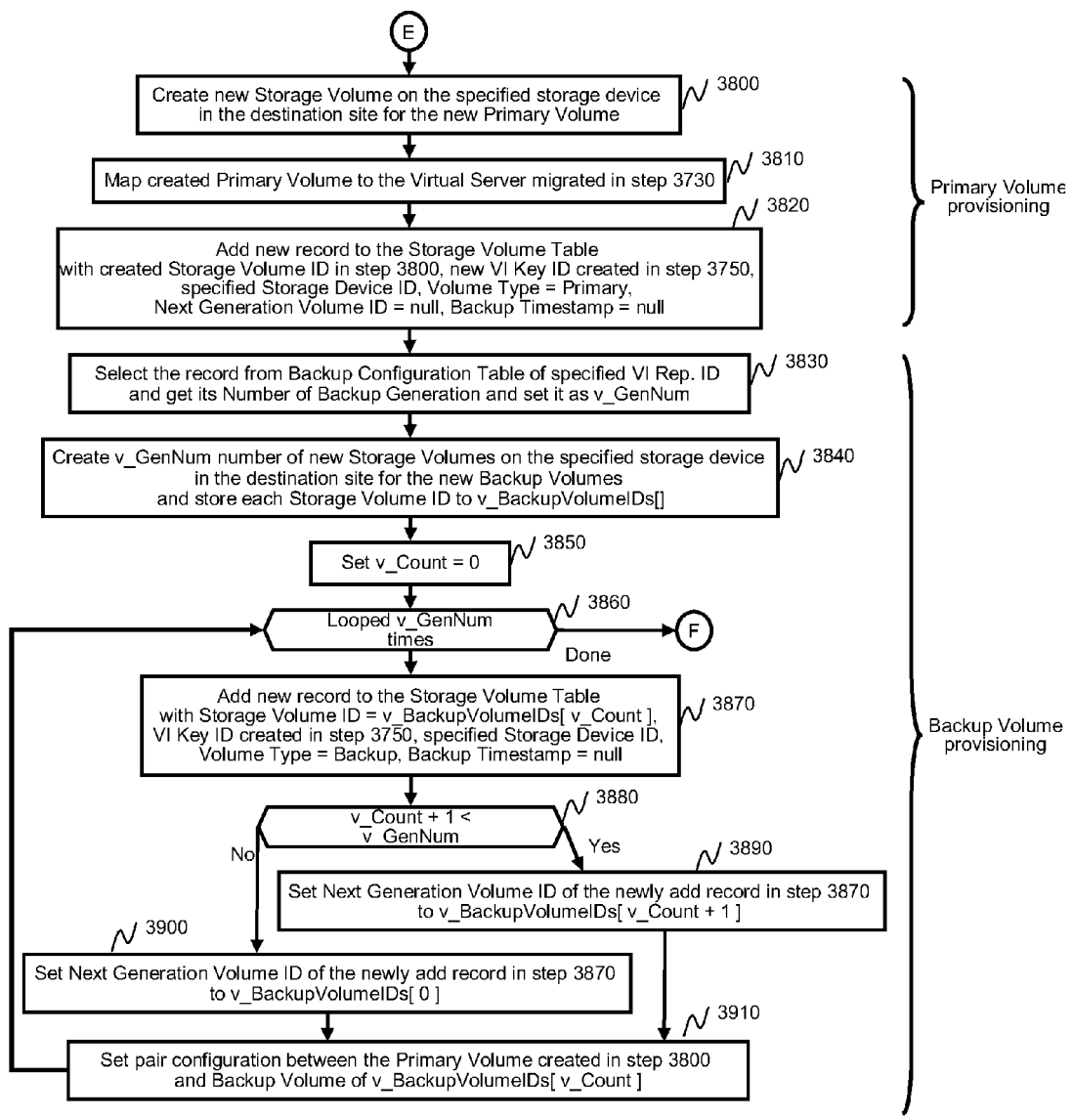
FIG. 21 Process of Migration (b)

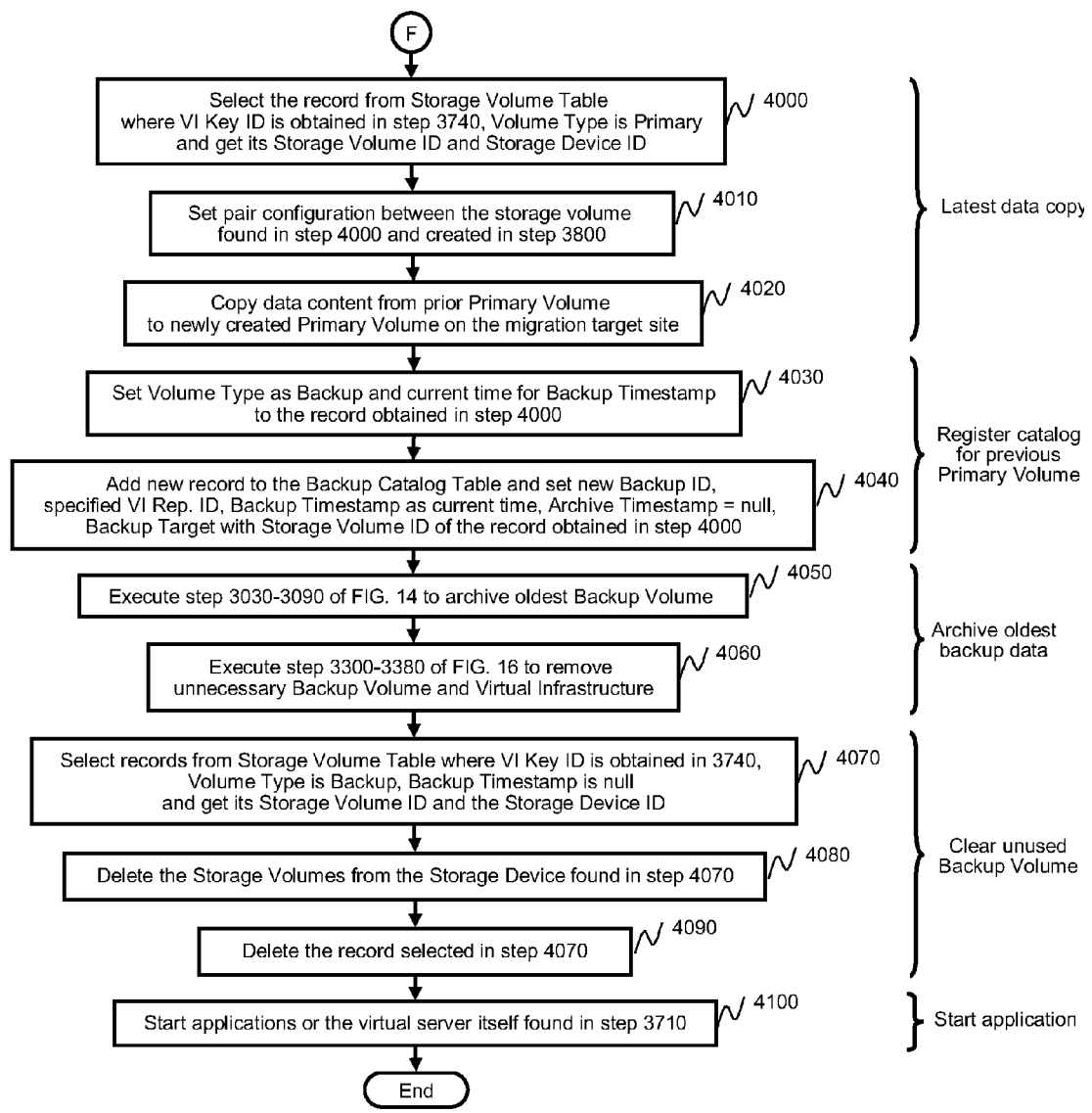
FIG. 22 Process of Migration (c)

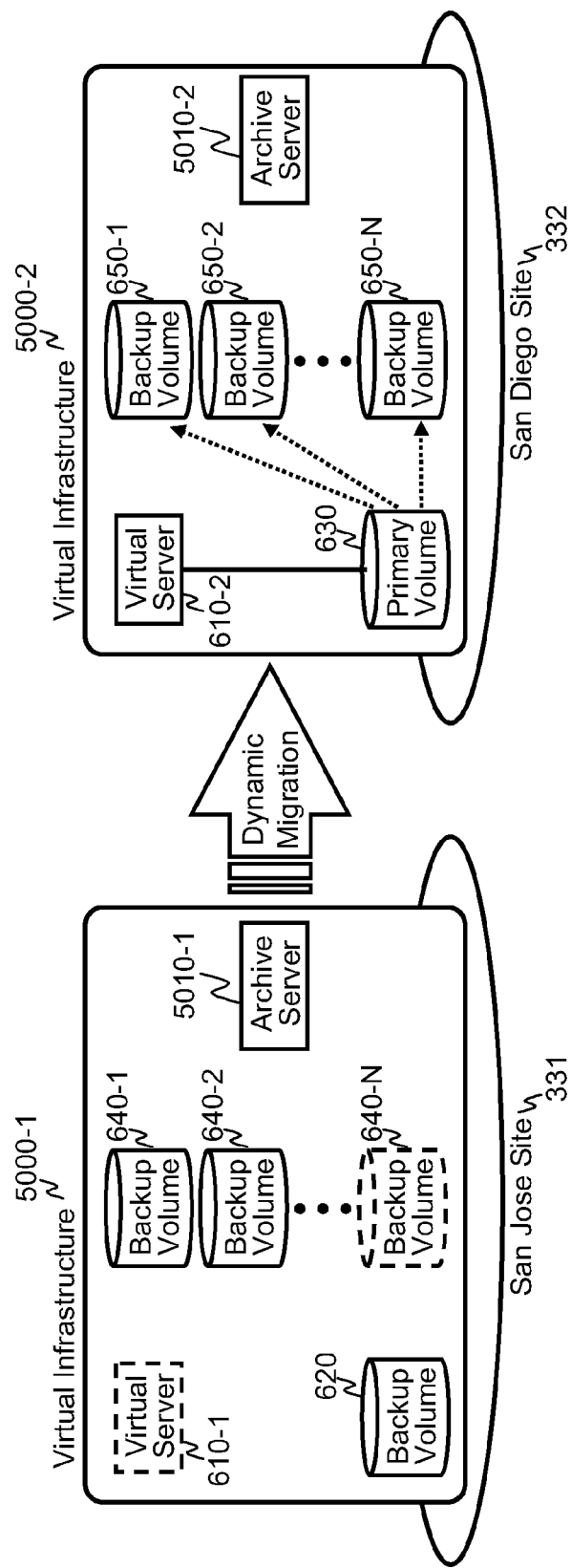
FIG. 23 Virtual Infrastructure with Backup Structure

| Virtual Server ID | Virtual Infrastructure Key ID | Physical Server ID | Application Type |
|---|---|---|---|
| VSrv1 | VI100 | PSrv1 | Production |
| VSrv2 | VI100 | PSrv1 | Archive |
| VSrv8 | VI105 | PSrv6 | Production |
| ... | ... | ... | ... |

FIG. 24 Data Structure of Virtual Server Table

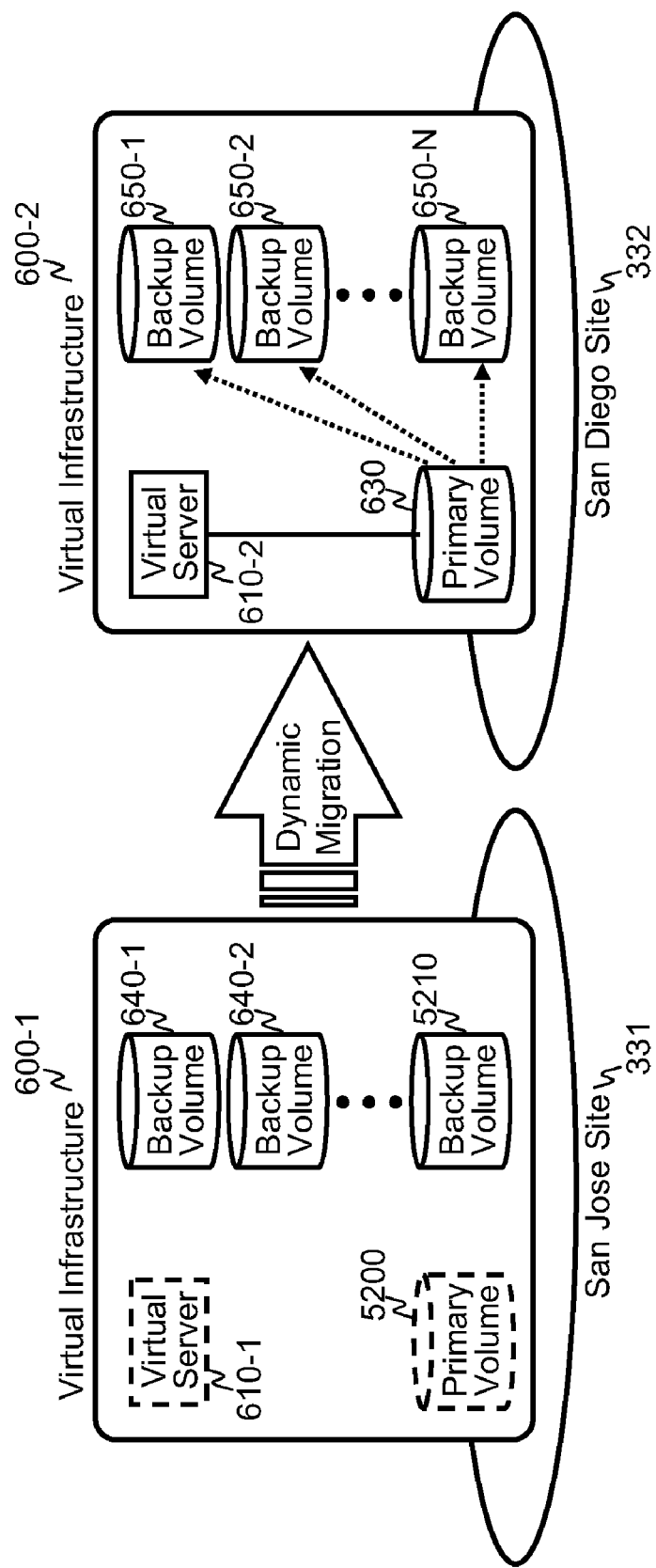
FIG. 25 Virtual Infrastructure with Backup Structure

DATA BACKUP SYSTEM AND METHOD FOR VIRTUAL INFRASTRUCTURE

CROSS REFERENCE TO RELATED PATENT APPLICATIONS

This is a Continuation Application of application Ser. No. 12/272,649, filed on Nov. 17, 2008, the disclosure of which is incorporated herein in its entirety by reference.

DESCRIPTION OF THE INVENTION

1. Field of the Invention

This invention relates in general to data backup methods and in particular to data backup systems and methods for virtual infrastructure.

2. Description of the Related Art

In the past, datacenters utilized separate silos for each application or operation and constructed their systems in a fixed manner. However, this type of IT system is inefficient and no longer acceptable. In order to maximize the utilization of IT resources within a company, a more dynamic lifecycle management system such as provisioning, modification, movement and deletion became mandatory in order to flexibly meet business needs.

Server and storage virtualization are key technologies used to achieve those goals. Server virtualization technology can execute a plurality of virtual servers on a single physical server, thereby dramatically improving the utilization of physical server resources. A logical instance of virtual server can also be created, deleted rapidly and even migrated between physical servers. Storage virtualization technologies can either offer a huge logical storage capacity by encapsulating and integrating numbers of storage devices, or it can offer a logically partitioned small capacity within a large enterprise device.

Server and storage virtualization technologies therefore present an IT resource pool independent to the physical device granularity based on a plurality of physical devices, and can either provide the demanded amount of resources at once or move the resource entities between local or remote sites. Enterprises have thus begun to carry out advanced IT operations such as dynamic IT resource provisioning and movement while maximizing the utilization of physical resources. The movement feature of the virtual infrastructure, created with a virtual server plus a virtual storage volume, tends to be more typical for use in disaster recovery, workload balancing or for finding an energy efficient solution.

However, new problems have emerged due to the deployment of such virtualization technologies. One of the most critical issues concerns the backing up of the virtual infrastructure. In a legacy datacenter, a fixed backup environment was provided for each silo. However, since the backup source instance frequently moves between sites, a fixed backup configuration will not work well on the virtualized system.

SUMMARY OF THE INVENTION

The inventive methodology is directed to methods and systems that substantially obviate one or more of the above and other problems associated with conventional techniques for data backup for virtual infrastructure.

Therefore, an aspect of this invention minimizes the number of copies needed for the purpose of data backup in a virtualized environment where the virtual server and storage volume move frequently between sites.

Aspects of the present invention include a virtualized IT system which provides a server resource pool and a storage resource pool composed from a plurality of physical devices either within a datacenter or a globally located plurality of datacenters. The virtual server and the storage volume provisioned from those pools will be paired to form the virtual infrastructure. In other words, the virtual infrastructure becomes a logical IT environment build with the required computing and storage resources needed in order to execute specific applications. The virtual infrastructure can also be migrated within/among datacenter sites.

Aspects of the present invention include systems for backing up data through the use of the virtual infrastructure. In normal methods of data back up, a plurality of backup volumes are prepared to represent multiple generations of backup data for the specific primary volume which is then used for real-time data read/write by application, and the data is copied periodically to those plurality of backup volumes cyclically. In the present invention, the virtual infrastructure holds a required number of generations of backup volumes as well as a primary volume. When the virtual infrastructure moves to another new location, the same set of backup volumes will be generated as part of the new virtual infrastructure on the new location.

Aspects of the present invention further include systems for reducing the number of copies needed to be produced during a virtual infrastructure migration. During the virtual infrastructure migration, the present invention renders it unnecessary to copy contents of backup volumes from the migration source side to the backup volumes generated on the migration target side. Instead, the present invention will record the existence of those backup volumes (or backup images) onto the backup catalog placed on the management server controlling the data backup operation of the virtual infrastructures for entire IT system.

Aspects of the present invention further include systems for tracking the latest generation of backup data. During the migration, the present invention registers a new record on the backup catalog by assigning the previous primary volume from the migration source side as the latest generation of backup data. Hence, the previous primary volume will be used not as the primary volume anymore but as one of the generations of backup volumes instead.

Aspects of the present invention further include systems for handling excessive backups. After a migration, the oldest backup volume from the migration source side will be discarded as a new backup on the virtual infrastructure of the migration target side is executed. If every backup volume on the migration source side has been discarded then the previous virtual infrastructure itself will be deleted.

Aspects of the present invention further include systems for data restoration from the backup volumes generated in the virtual infrastructure. If the need for data restoration from a backup volume to the primary volume becomes necessary, the present invention shows the backup catalog list of a specified virtual infrastructure to an administrator. Once the administrator selects the desired backup data, the present invention will restore the data either from the backup volume on the latest virtual infrastructure or from a different location in which a previous virtualization infrastructure exists.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 1 illustrates an embodiment of the physical hardware architecture of the present invention.

FIG. 2 illustrates an embodiment of the software and the logical element structure of the present invention.

FIG. 3 illustrates an embodiment of the logical element structure and the behavior for the dynamic server/storage resource provisioning and its migration in the present invention.

FIG. 4 illustrates an embodiment of the logical elements of the data backup volumes of the present invention.

FIG. 5 illustrates an embodiment of the logical elements and behavior of the cyclic data backup through the use of plural backup volumes in the present invention.

FIG. 6 illustrates an embodiment of the logical elements of the virtual infrastructure having backup volumes in the present invention.

FIG. 7 illustrates an embodiment of the logical elements and operation for the backup process while having a plurality of virtual infrastructures after the migration in the present invention.

FIG. 8 illustrates an example data structure of the virtual infrastructure table in the present invention.

FIG. 9 illustrates an example data structure of the virtual server table in the present invention.

FIG. 10 illustrates an example data structure of the backup configuration table in the present invention.

FIG. 11 illustrates an example data structure of the storage volume table in the present invention.

FIG. 12 illustrates an example data structure of the backup catalog table in the present invention.

FIG. 13 illustrates an example user interface for the backup data selection in the present invention.

FIGS. 14 through 16 illustrate an example process for periodical data backup for a specific virtual infrastructure in the present invention.

FIGS. 17 through 19 illustrate an example process for data restoration for a specific virtual infrastructure in the present invention.

FIGS. 20 through 22 illustrate an example process for virtual infrastructure migration in the present invention.

FIG. 23 illustrates an example embodiment of a virtual infrastructure with backup structure.

FIG. 24 illustrates an example embodiment of a data structure of a virtual server table.

FIG. 25 illustrates another example embodiment of a virtual infrastructure with a backup structure.

DETAILED DESCRIPTION

Figure 26:
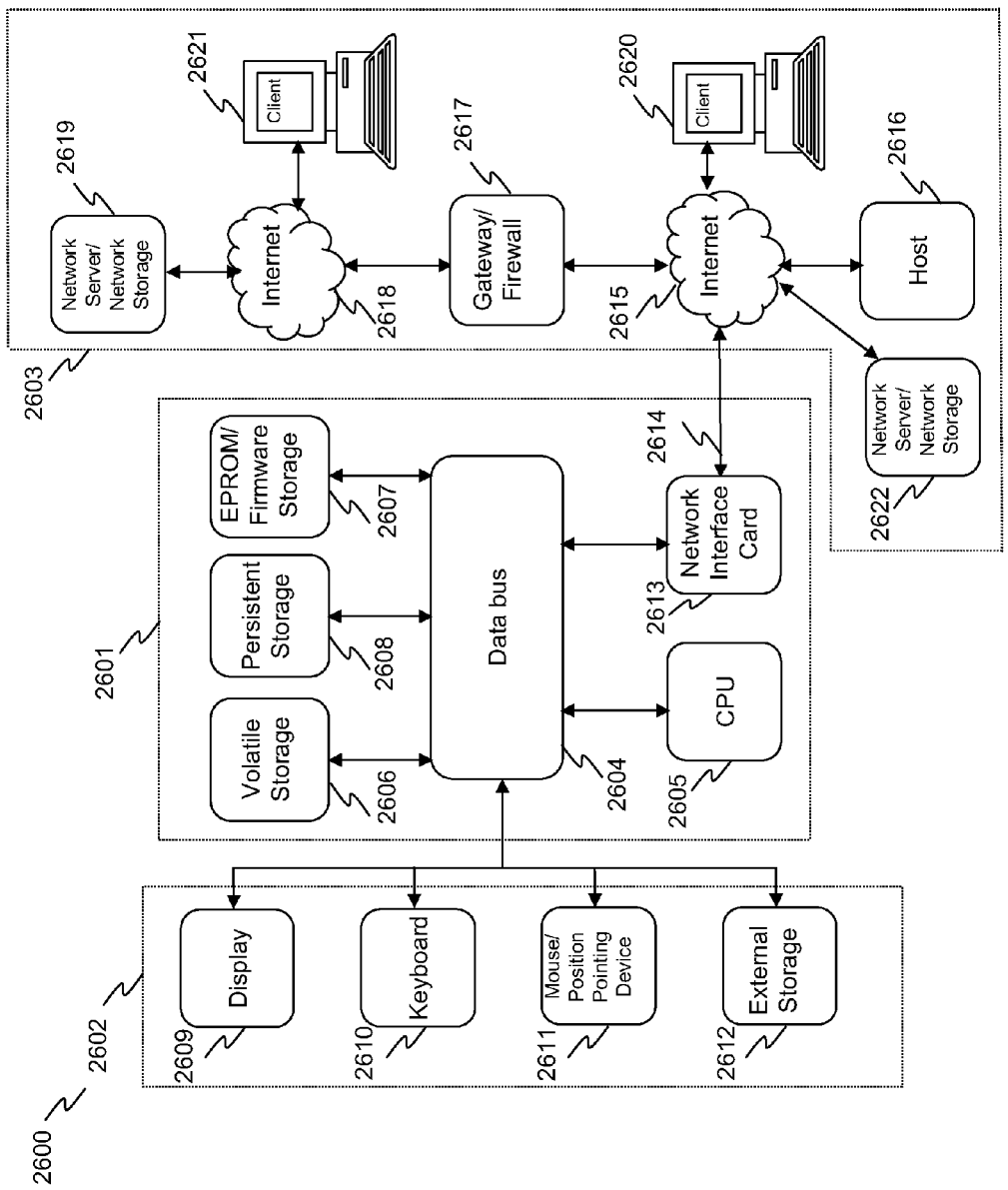
FIG. 26 illustrates an exemplary embodiment of a computer platform upon which the inventive system may be implemented.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

FIG. 1 shows an exemplary embodiment of the physical hardware architecture of the present invention.

The overall system contains a plurality of storage systems 100-1, 110-2, 100-N, and a plurality of servers 110-1, 110-2, 110-N, tape systems 120 and management servers 130. Each device is connected through a network 140. The network connection can be assumed either within a datacenter room or through connections between datacenters located in different places. In this example the management server 130 is connected to the production network 140 which shares the management commands transfer with data input and output. However, having another management dedicated network in addition to the production network 140 can also be utilized.

Many storage systems are deployed in a datacenter or among a plurality of datacenters. Physical storage systems are integrated and provide storage capacity for a logical storage resource pool. A storage system can comprise a controller 101 and a plurality of storage mediums 105. The controller includes a CPU 102, memory 103, and a network interface 104. Storage mediums are connected to the controller and can be various types of storage devices such as hard disk, flash memory, optical disk and so on.

The servers are deployed in a datacenter or among a plurality of datacenters. Physical servers are integrated and provide computing capacity for a logical server resource pool. Such servers can comprise a CPU 111, memory 112, and network interface 113

The tape system 120 can be used for data archiving of unneeded backups. Such a tape system can be a tape device, but it can also be any type of archiving solution such as CAS (Content-Addressable Storage). Such tape systems have a controller 121 composed with CPU 122, memory 123 and network interface 124 and tapes 125 can be loaded to the device.

The management server 130 may comprise a CPU 131, memory 132, and network interface 133. It controls IT operations in this system such as constructing a server/storage resource pool with physical servers 110 and storage systems 100, providing the required amount of server/storage resources and forming a logical IT infrastructure, migrating the logical infrastructure among the system, and managing the data backup operations for those logical infrastructures deployed in the system.

FIG. 2 shows an embodiment of the software and the logical element structure of the present invention.

The physical servers 110 can utilize a hypervisor 210 which can logically produce and perform a virtualized server instance in the virtual server 211. A single physical server or hypervisor on the physical server can thus generate and control a plurality of virtual servers at a time. Physical resources such as CPU, memory or network interface are shared or partitioned with that plurality of virtual servers. Each virtual server can execute applications respectively as if each virtual server is running standalone.

The array group 220 is the logical capacity which is composed of a plurality of storage mediums 105 arranged in a RAID array. For example it could be composed as a RAID 5 array with 3 disks of data and 1 parity disk. Storage Volume 221 is another logical capacity which was carved from the array group which is used by the virtual server 211 to read and write data from running applications.

The Virtual Infrastructure Management Module 200 is a key program of this present invention which operates entire IT operations in this system such as constructing a server/storage resource pool with physical servers 110 and storage systems 100, provisioning the required amount of server/storage resources and forming the logical IT infrastructure, migrating the logical infrastructure among the system, and managing the data backup operations for those logical infrastructures deployed in the system. The Virtual Infrastructure Table 1000 holds records for logical infrastructure instances which have association information of related logical infrastructures and their location information. The Virtual Server Table 1100 holds records for the respective virtual servers indicating which physical server is hosting the virtual server. The Backup Configuration Table 1200 holds records describing the backup method or structure of backup environment for respective logical infrastructures. The Storage Volume Table 1300 holds records for respective storage volume information for both production used volumes and also backup target volumes. The Backup Catalog Table 1400 holds records of history of data backup for each production volume of the logical infrastructure such as when and where the data was backed up. It is the catalog of backed up data images that will be used when restoring the data from backup volume to the production volume.

FIG. 3 illustrates an embodiment of the logical element structure and the behavior for the dynamic server/storage resource provisioning and its migration in the present invention.

Entire servers 110 are logically integrated and compose a single Virtualized Server Pool 320. In this example, some of the servers are located in the datacenter at San Jose Site 331 and some are located in the San Diego Site 332 separately, but every server is gathered and utilized to form this Virtualized Server Pool. The pool represents a huge computing capacity that can carve out the required amount of computing resources when requested. Similarly, every storage system 100 is logically integrated and composes a single Virtualized Storage Pool 310. The pool represents a huge amount of storage capacity that can carve the required amount of storage capacity (i.e., storage volume) when requested. The Virtual Infrastructure 300 is an entity which contains a virtual server 211 provisioned from the Virtualized Server Pool and a storage volume 221 provisioned from the Virtualized Storage Pool, and it also represents a logically constructed IT infrastructure to perform certain applications.

The virtual infrastructure can be migrated between datacenters by the Virtual Infrastructure Module 200 on the management server 130. On the figure, the virtual infrastructure 300-1 was previously located on the San Jose Site 331 but it has subsequently migrated to the San Diego site 332 as virtual infrastructure 300-2 and runs its application at the San Diego site instead. During the migration, the data stored on the storage volume 221-1 was copied to the storage volume 221-2 on the new location.

FIG. 4 illustrates an embodiment of the logical elements of the data backup volumes of the present invention.

Data written by an application to a storage volume allocated to the Virtual Infrastructure will be protected through periodic backups. The primary volume 400 is the storage volume that is accessed from the application on the virtual server 211 to read and write data. The backup volumes 410-1, 410-2, 410-3, 410-N are the data backup target of the storage volume and typically a plurality of them are provided to hold a plurality of generations of backup data. Thus, data on the primary volume is generation #0 and the most recent backup data on the backup volume 410-1 is the generation #1 and the second latest backup data in backup volume 410-2 is the generation #2 and the oldest data is stored in backup volume 410-N as generation #N.

FIG. 5 illustrates an embodiment of the logical elements and behavior of the cyclic data backup through the use of a plurality of backup volumes in the present invention.

As described in FIG. 4, a plurality of backup volumes can store generations of backup data. However, it is not possible to have an infinite number of backup volumes; hence, a limited number of volumes are used for backup purposes while utilizing cyclic overwriting. We present a three backup volume example in FIG. 5. The "Backup step #1" 500 shows that three backup volumes 540-1, 540-2, and 540-3 are prepared for backing up the data of the primary volume. After the first backup process has completed, the first backup volume 540-1 will contain the copy of the latest data of the primary volume while the second backup volume 540-2 and the third backup volume 540-3 remain unused. After a period of time, the next backup process is performed as "Backup step #2", which copies the latest data from the primary volume onto backup volume 550-2. When the process is completed, the second backup volume 550-2 will contain the first generation data and the first backup volume 550-1 will contain the second generation data. Similarly on step #3 520, data from the primary volume is copied onto the third backup volume 560-3 and now three generations of backup data are stored in the plurality of backup volumes 560. Lastly on step #4 530, another backup process is performed, but since every backup volume was used in prior backup processes, this time it will overwrite the first backup volume 570-1 with the latest data from the primary volume. The old data is overwritten, and the first backup drive will thus contain the first generation backup data. Of course, this does not have to be limited to three drives; the backup system can be expanded to hold N generations of data through the use of N backup volumes in the same cyclical manner.

FIG. 6 illustrates an embodiment of the logical elements of the virtual infrastructure having backup volumes in the present invention.

As described in FIG. 5, the plurality of backup volumes is provisioned from the storage resource pool to backup the primary volume data of a virtual infrastructure. Therefore, in this invention, a virtual infrastructure contains not only a virtual server and a primary storage volume but also includes the required number/generations of backup volumes as well. The virtual infrastructure 600-1 on FIG. 6 shows the components of virtual infrastructures.

In addition, the migration of the virtual infrastructure as described with FIG. 3 also assumes the backup environment. All provisioned backup volumes are thus migrated to the destination as well as the virtual server and primary volume as shown in 600-1 and 600-2. During the migration, the method of migrating the components varies within the virtual infrastructure. The virtual server that is running specific applications will be moved to the target destination as virtual server 610-2, with the original virtual server 610-1 deleted. The primary volume containing the latest data written by the virtual server applications will be migrated to the new primary volume 630, which is created on the migration target side of the virtual infrastructure 600-2, and the latest data stored in the volume is copied from the prior primary volume to the newly created volume which is then subsequently mapped to the virtual server 610-2. For the backup volumes, a new set of backup volumes 650-1, 650-2, 650-N is created on the migration target side of the virtual infrastructure 600-2 and configured as the pair with the new primary volume 630 on the target side. However, these backup volumes will not have data copied to them during the virtual infrastructure migration process, thus leaving them empty at that time. The backup volumes 640-1, 640-2 and 640-N on the migration source side of the virtual infrastructure are kept as generations of backup data for the primary volume on the target virtual infrastructure. When used in conjunction with a backup catalog, these prior backup volumes can be accessed even after the migration. By not copying the backup data along with the virtual infrastructure, this lightens the data copy workload of the migration process and that is the one of the primary benefits of the present invention. Finally, the prior primary volume 620 will be used as the latest generation of backup data since it has the same content of the newly migrated primary volume on the target side. This is achieved by adding a new record in the backup catalog with the information of the prior primary volume 620. Thus the prior primary volume 620 will not be discarded, however, because N+1 generations of backup data now exist due to the inclusion of the prior primary volume 620, the oldest backup volume 640-N on the migration source side is discarded so that a N number of backup volumes are kept on the virtual infrastructure 600-1 as a result.

FIG. 7 illustrates an embodiment of the logical elements and operation for the backup process while having a plurality of virtual infrastructures after the migration in the present invention.

Virtual infrastructure 700-1 represents the migration source side and virtual infrastructure 700-2 represents the migration target side, both of which exist after the migration. In this example, we present a virtual infrastructure configured with two generations of backup data. In the "Initial status" 710, the primary volume 710-4 only exists on the target side and the two generations of backup volumes 710-1, 710-2 for the primary volume are located within the older virtual infrastructure 700-1 while two newly generated backup volumes 710-5, 710-6 have no data in them yet. Backup volume 710-3 which was used as the oldest generation of data backup just before the migration has already been discarded at this point. When the backup process is executed as "Backup step #1" 720, the latest data is thus copied to the backup volume 720-5 and the third generation of backup volume 720-2 will be discarded. Similarly, on step #2 730, the primary volume data is copied onto Backup Volume 730-6 and the oldest backup volume 730-1 is discarded. Since the process results in discarding every component within the virtual infrastructure 700-1, the virtual infrastructure itself will be also removed. After that, subsequent backup process will be performed by using the backup volumes on the virtual infrastructure 700-2 cyclically to maintain two generations of backup data.

FIG. 8 illustrates an exemplary data structure of the virtual infrastructure table in the present invention.

FIG. 8 shows an example data structure of a Virtual Infrastructure Table 1000. It shows the location of a virtual infrastructure and its association between the migrated virtual infrastructures.

The Virtual Infrastructure Key ID 1010 provides a unique identifier of the respective virtual infrastructure (for each virtual infrastructure after the migration).

The Virtual Infrastructure Representative ID 1020 provides a representative identifier for associated virtual infrastructures and is shared after the migration has occurred.

The Primary Flag 1030 indicates whether a virtual infrastructure is the most recently created virtual infrastructure within the associated virtual infrastructures.

The Site Location 1040 indicates the site location of the virtual infrastructure.

The Previous VIK ID 1050 identifies the previous Virtual Infrastructure Key ID for when the instance was associated as a previous virtual infrastructure.

For example, line 1091 represents a record of a virtual infrastructure which has "V1100" as the unique Key ID, belongs to the group of Virtual Infrastructure Representative ID "VIR1", is associated as a previously existing instance, is located in the "San Jose" site, and doesn't have a previous associated instance. Line 1092 shows another virtual structure as being the primary virtual infrastructure of line 1091. It has the same Virtual Infrastructure Representative ID "VIR1" with Primary Flag set at "true" and the Previous VIK ID is "V1100" which points the Key ID of line 1091.

This table is referred to by the Virtual Infrastructure Management Module 200 in FIG. 2 to find out the location of each virtual infrastructure or associated instances.

FIG. 9 illustrates an example data structure of the virtual server table in the present invention.

FIG. 9 shows an example data structure of Virtual Server Table 1100. It shows the information for respective virtual servers and which physical server they belong to.

The Virtual Server ID 1110 is the identification of a virtual server.

The Virtual Infrastructure Key ID 1120 provides a unique identifier of the respective virtual infrastructure (for each virtual infrastructure after the migration).

The Physical Server ID 1130 identifies the physical server that hosts the virtual server.

For example, line 1191 represents a record of a virtual server which has "VSrv1" as the ID, indicating that it belongs to the virtual infrastructure "V1100", and the physical server "PSrv1" hosts this virtual server.

This table is referred by the Virtual Infrastructure Management Module 200 in FIG. 2 to find out the location of the virtual server.

FIG. 10 illustrates an example data structure of the backup configuration table in the present invention.

FIG. 10 shows an example data structure of Backup Configuration Table 1200. It shows a backup method or a structure of the backup environment for the respective virtual infrastructures.

The Virtual Infrastructure Representative ID 1210 is a representative identification for the associated virtual infrastructures.

The Number of Backup Generations 1220 indicates the number of backup volumes (i.e., backup generations to maintain) to be created within the virtual infrastructure.

The Archive Method 1230 indicates the archive method to be utilized for the backed up data. "None" means nothing is to be done. "Latest" means that the latest data will be archived concurrently to the backup process. "Oldest" means that the oldest generation of backup volume data will be archived just before the backup process starts.

The Archive Device ID 1240 is an identifier for the tape system (or any other archiving system).

The Backup Period 1250 indicates the type cycle for which the backup process for the virtual infrastructure will be performed periodically.

For example, line 1291 represents a record showing the backup configuration for a virtual infrastructure of the group "VIR1". Two backup volumes will be created when provisioning or migrating the new Virtual Infrastructure instance wherein its latest data will be archived to the device "TL1" along with the backup process of the primary volume. The backup process for this virtual infrastructure will be performed once in 12 hours.

This table is referred to by the Virtual Infrastructure Management Module 200 in FIG. 2 to find out how many of the backup volumes need to be constructed or how the archive and backup process needs to be done.

FIG. 11 illustrates an example data structure of the storage volume table in the present invention.

FIG. 11 shows an example data structure of the Storage Volume Table 1300. It shows the respective storage volume information for both the production used volumes and the backup target volumes.

The Storage Volume ID 1310 is an identifier for a storage volume.

The Virtual Infrastructure Key ID 1320 is a unique identifier for the respective virtual infrastructure.

The Storage Device ID 1330 is an identifier for the storage device which hosts the storage volume.

The Volume Type 1340 indicates whether the storage volume is being used for production or backup.

The Next Generation Volume ID 1350 indicates the backup drive volume ID to be used in the next backup process after a particular backup volume is used. If only one generation of backup volume is deigned, then the storage volume ID is used.

The Backup Timestamp 1360 indicates the timestamp for the latest backup on a particular volume.

For example, line 1392 represents a record that this particular volume is the primary volume for the virtual infrastructure "VI101" and hosted by the "Strg2" storage system and its ID is "Vol04". The storage volume "Vol05" on line 1393 is a backup volume of same Virtual Infrastructure "VI101". It is hosted by the storage system "Strg3" and it has been used as a backup performed at "2000-01-03 21:11" with the next volume to be used is "Vol06".

This table is referred to by the Virtual Infrastructure Management Module 200 in FIG. 2 to find out the association of backup volumes in a specific virtual infrastructure and also for finding the latest or oldest backup data within those backup volumes.

FIG. 12 illustrates an example data structure of the backup catalog table in the present invention.

FIG. 12 shows an example data structure of Backup Catalog Table 1400. It holds the history of data backup for each production volume of the virtual infrastructure such as when and where the data was backed up. It is the catalog of backed up data images that will be used when restoring the data from backup volume to the production volume.

The Backup ID 1410 is the identifier for a single backup process.

The Virtual Infrastructure Representative ID 1420 is the representative identifier for the associated virtual infrastructures.

The Backup Timestamp 1430 is the timestamp for the latest backup process of the virtual infrastructure.

The Archive Timestamp 1440 is the timestamp for the latest archive process of the virtual infrastructure.

The Backup Target 1450 is the target device ID of the either backup or archive.

For example, line 1500 represents a record of the backup process for the Virtual Infrastructure "VIR2" at "2000-01-03 10:15". The data on the primary volume was backed up onto the backup volume "Vol08" and its backup data is identified as "BU033". Just before that, as shown in line 1495, the older backup data for the virtual infrastructure "VIR2" was archived to the tape device "TL2" at "2000-01-03 10:00" which was originally backed up at "2000-01-02 16:15". After 6 hours, based on the backup period of "VIR2" as shown in FIG. 10, the next backup process for this virtual infrastructure is done at "2000-01-03 16:15" to the backup volume "Vol09" and stamped as "BU034" as shown in line 1501. As shown here, each virtual infrastructure will be backed up and archived periodically. However, in line 1499, this record was registered when the migration process of the virtual infrastructure "VIR1" was performed. This record indicates that the volume previously used as the primary volume on the migration source side of the virtual infrastructure has now been reassigned as a backup volume. Also, in lines 1491 and 1494, the backup process for "VIR1" was to be executed at a periodic cycle of every 12 hours at roughly 11:00 am and 11:00 pm, but since the migration process was executed around 9:00 am as indicated by line 1499, the next backup process was done at 9:00 pm according to the line 1502. Thus, this embodiment of the invention demonstrates that it will restart the periodical backup process based on the migration time; however, continuing the backup process timing with 11:00 am and 11:00 pm (in this case) could be also done as an option.

This table is referred by the Virtual Infrastructure Management Module 200 in FIG. 2 to record when and where the data was backed up.

FIG. 13 shows an example of a user interface for backup data selection. Such an interface is used by an administrator to determine which backup data is restored on the primary volume. First, the administrator will select which virtual interface needs to be restored. Screen 2000 is then displayed, showing backup catalog information regarding to the specific virtual infrastructure selected.

Backup ID 2010 is an identifier of backup data.

Backup Time 2020 is the timestamp for the backup data.

Backed up location 2030 is the storage volume ID or ID used for the archive device.

Archived icon 2040 is an icon which indicates if this backup data is located on the archive device.

Remote icon 2050 is an icon which indicates if this backup data is located in a remote site.

Local icon 2060 is an icon which indicates if this backup data is located in local site.

Cancel button 2070 is a button to cancel the restore process.

Start Restore button 2080 is a button to start the restore process with administrator selected backup data.

For instance, line 2091 shows a backup data identified as "BU024" which was backed up at "2000-01-01 23:42", but has also already been archived to the device "TL1". Icons 2040, 2050 and 2060 indicate roughly where the backup data is placed so that the administrator will know how long the restore process would be. Remote icon 2050 in line 2094 indicates that this backup data is on the backup volume of a remote site. Local icon 2060 in line 2095 indicates that this backup data is on the backup volume of a local site and thus can be restored in short time. Line 2094 shows that the administrator selected this backup data in this example. As demonstrated in the figure, the available backup data are listed in a uniform manner for ease of use.

FIGS. 14 through 16 illustrate an example process for periodical data backup for a specific virtual infrastructure in the present invention.

FIGS. 14 through 16 show an example process for periodical data backup for a specific virtual infrastructure as executed by the Virtual Infrastructure Management Module 200 in FIG. 2. First, a backup target virtual infrastructure representative ID (VI Rep. ID) is selected and fed into the process. Subsequently, the steps from 3000 to 3020 are executed, with the applications or the virtual server itself stopped in order to perform the data backup.

Step 3000 selects the record from the virtual infrastructure table which has a specified VI Rep. ID. and a primary flag of "true". Then the VI Key ID is obtained.

Step 3010 selects the record from the virtual server table which has a VI Key ID obtained from step 3000.

Step 3020 stops the application or the virtual server itself as found in step 3010.

Steps 3030 to 3040 check the archive method for the virtual infrastructure. Step 3030 selects the record from the backup configuration table of a specified VI Rep. ID. Subsequently, the number of backup generations, archive method, and the archive device ID are acquired. Step 3040 checks if the archive method obtained in step 3030 is the "Oldest"; if so, the process will proceed to step 3050, otherwise it will jump to step 3100.

Steps 3050 to 3090 archive the oldest backup volume data. Step 3050 selects records from the backup catalog table which has a specified VI Rep. ID and an archive timestamp of "null". Step 3060 checks if the number of records selected in step 3050 is less than the number of backup generations obtained in step 3030. If so, then the process jumps to step 3100 otherwise if every generation of backup volumes has been used then the process proceeds to step 3070. Step 3070 selects the record from the result of step 3050 with the oldest backup timestamp. The backup volume ID from the backup target is then acquired. Step 3080 archives data in the storage volume found in step 3070 to the archive device found in step 3030. Step 3090 puts the archive timestamp of the record obtained in step 3070 as the current time and the backup target as the archive device ID.

Step 3100 selects which backup volume to use for the backup. Step 3100 selects the record from the storage volume table where the VI Key ID was obtained in step 3000, the volume type is "Backup" and the backup timestamp is either "null" or the latest time. Then the next generation volume ID is obtained.

Steps 3110 to 3150 copy the latest data from the primary volume to the specified backup volume. Step 3110 selects the record (for the primary volume) from the storage volume table where the VI Key ID was obtained in step 3000 and the volume type is "Primary". Then the storage volume ID and the storage device ID are obtained. Step 3120 selects the record (for the backup target backup volume) from the storage volume table where the storage volume ID is the same as the next generation volume ID obtained in step 3100. Then the storage device ID is obtained. Step 3130 copies data content of the primary volume from step 3110 to the backup volume from step 3120. Step 3140 puts the backup timestamp as the current time of the record (for the used backup volume) found in step 3120. Step 3150 adds a new record to the backup catalog table and sets up a new backup ID, a specified VI rep. ID, backup timestamp as current time, archive timestamp as "null", and backup target as the storage volume ID obtained in step 3120 (Backup Volume).

Steps 3200 to 3220 archive the latest data on the primary volume. Step 3200 checks if the archive method obtained in step 3030 was "Latest". If so, it proceeds to step 3210, otherwise it jumps jump to 3300. Step 3210 archives data in the primary volume found in step 3110 to the archive device found in step 3030. Step 3220 adds a new record to the backup catalog table and sets a new Backup ID, specified VI Rep. ID, backup timestamp and archive timestamp to be the current time, and backup the target with the archive device obtained from step 3030.

Steps 3300 to 3360 remove the unnecessary backup volume if it exists. After the migration process, the backup volumes on the migration source side of the virtual infrastructure will be left behind as the backup data instead of being copied to the migration target side of the virtual infrastructure. The backup volumes provisioned on the target side are initially empty. However, in accordance with the periodical backup process, the backup volumes on the target side will be used and the older backup volume placed in the migration source side will be no longer used. Thus it needs to be eventually removed.

Step 3300 selects all records from the virtual infrastructure table which has the specified VI Rep. ID. Then, their VI Key IDs are obtained. Step 3310 selects records from the storage volume table where the VI Key ID match with obtained in step 3300, the volume type is "Backup", and the backup timestamp is not "null". Step 3320 checks if the number of obtained records in step 3310 is equal or less than the "number of backup generations" as obtained in step 3030. If so, then the backup process is ended, otherwise if it exceeds the number of generations required then step 3330 is executed. Step 3330 selects the record with the oldest backup timestamp as a result of step 3310. Then the storage volume ID, storage device ID, and the VI Key ID (to use in case if the virtual infrastructure that the oldest backup volume belongs need to be deleted as well) are obtained. Step 3340 deletes the storage volume from the storage device found in step 3330. Step 3350 deletes the record from backup catalog table which has the storage volume ID found in step 3330 as the backup target. Step 3360 deletes the record selected in step 3330.

Steps 3370 to 3380 remove the unnecessary virtual infrastructure if every backup volume in it was deleted. Step 3370 selects the record from the storage volume table where the VI Key ID is the same as the one obtained in step 3330 (in other words, it looks for any other backup volumes on the same virtual infrastructure). If some backup volumes still exist then the backup process is ended, otherwise if the deleted backup volume was the last one in that virtual infrastructure, then step 3380 is executed. Step 3380 deletes the record from the virtual infrastructure table which has the same VI Key ID obtained from step 3330.

Step 3390 restarts the application or the virtual server found in step 3010.

FIGS. 17 through 19 illustrate an example process for data restoration for a specific virtual infrastructure in the present invention.

FIGS. 17 through 19 show an example process for data restoration for a specific virtual infrastructure executed by Virtual Infrastructure Management Module 200. First, a restore target Virtual Infrastructure Representative ID (VI Rep. ID) is selected and fed into the process. Then the steps from 3400 to 3470 are executed, displaying a user interface for the administrator to determine which backup data is to be used for the restoration.

Step 3400 selects all records from the backup catalog table with the same VI Rep. ID that was selected. If no such records are found after every record is processed, the process jumps to step 3500, otherwise step 3410 is executed.

Step 3410 adds the record to the "Backup Catalog" list on the screen along with the Backup ID, Backup Timestamp, and Backup Target of the found record.

Step 3420 checks if the archive timestamp of the record is not "null" (indicating that it has archived). If it is not "null", then step 3430 is executed, otherwise the process will proceed to step 3440.

Step 3430 displays an [Archived] icon on that line and proceeds back to step 3400.

Step 3440 selects the record from the storage volume table where the storage volume ID is the same as the backup target obtained from step 3410 (from the backup catalog table). The VI Key ID is then obtained.

Step 3450 selects the record from the virtual infrastructure table with the same VI Key ID as obtained from step 3440. The primary flag value is then obtained. If the value is false, indicating that the virtual infrastructure is on the remote site from the perspective of the virtual infrastructure with the primary volume to be restored, then step 3460 is executed, otherwise if the value is true, indicating that the primary volume and the backup volume are on the same site, then step 3470 is executed.

Step 3460 displays a [Remote] icon on that line and proceeds back to step 3400.

Step 3470 displays a [Local] icon on that line and proceeds back to step 3400.

Steps 3500 to 3530 allow the administrator to select which backup data is to be used for the restoration. Step 3500 prompts for the administrator to select one of the backup data from the "Backup Catalog" list on the screen. Step 3510 gets the backup target value of the selected item. Step 3520 checks if the location of the selected backup data is "Local". If so, then step 3540 is executed, otherwise the process proceeds to step 3530. Step 3530 warns the administrator that the restoration might take long time due to the selection being a remote copy.

Steps 3540 to 3560 stop the application or the virtual server itself in order to perform the data restoration. Step 3540 selects the record from the virtual infrastructure table with specified VI Rep. ID and the primary flag is "true". Then the VI Key ID is obtained. Step 3550 selects the record from the virtual server table which has the same VI Key ID as obtained in step 3540. Step 3560 stops the application or the virtual server itself as found in step 3550.

Steps 3600 to 3640 restore the data from the selected backup data to the primary volume. Step 3600 selects the record (for the primary volume) from the storage volume table with the same VI Key ID as obtained in step 3540 and where the volume type is "Primary". Then the storage volume ID and storage device ID are obtained. Step 3610 checks if the location of the backup data is "Archived". If so, the process then jumps to step 3640, otherwise it proceeds to step 3620. Step 3620 selects the record (for the restoration source backup volume) from the storage volume table with the same storage volume ID as obtained in step 3510. Then the storage device ID is obtained. Step 3630 copies the data content of the backup volume found in step 3620 to the primary volume found in step 3600. Then the process proceeds to step 3650. Step 3640 restores the data from the archive device obtained from step 3510 by specifying the backup ID or the backup timestamp to the primary volume in step 3600.

Step 3650 restarts the application or the virtual server itself as found in step 3550.

FIGS. 20 through 22 illustrate an example process for virtual infrastructure migration in the present invention.

FIGS. 20 through 22 shows an example process of the virtual infrastructure migration as executed by the Virtual Infrastructure Management Module 200. First, a migration target Virtual Infrastructure Representative ID (VI Rep. ID), destination site, a physical server, and a storage device to use for provisioning new resources are selected and given to the process.

Steps 3700 to 3720 stop the application or the virtual server itself in order to perform data backup. Step 3700 selects the record from the virtual infrastructure table which has the specified VI Rep. ID and a primary flag of "true". Then the VI Key ID is obtained. Step 3710 selects the record from the virtual server table which has the VI Key ID obtained in step 3700. Step 3720 stops the application or the virtual server itself found in step 3710.

Steps 3730 to 3760 migrate the virtual server. Step 3730 migrates the virtual server found in step 3710 onto the specified physical server in the destination site. Step 3740 selects the record from the virtual infrastructure table which has the specified VI Rep. ID and a primary flag of "true". The primary flag is then set to "false" and the VI Key ID is obtained. Step 3750 adds a new record (for the migration target) to the virtual infrastructure table with the new VI Key ID, the specified VI Rep. ID, primary flag of "true", site location as the specified destination site, and the previous VIK ID as obtained in step 3740. Step 3760 sets the new VI Key ID created in step 3750 and the specified physical server ID on the record of migrated virtual server obtained in step 3710.

Steps 3800 to 3820 provision the new storage volume to be used as the primary volume. Step 3800 creates the new storage volume on the specified storage device in the destination site for the new primary volume. Step 3810 maps the created primary volume to the migrated virtual server of step 3730. Step 3820 adds a new record to the storage volume table with the created Storage Volume ID in step 3800, the new VI Key ID created in step 3750, the specified storage device ID, the volume type set to "Primary", the next generation volume ID set to "null", and the backup timestamp set to "null".

Steps 3830 to 3910 provision the new storage volumes to be used as the requisite generations of backup volumes.

Step 3830 selects the record from the backup configuration table of the specified VI Rep. ID. Then the number of backup generations is obtained and the value is given to the variable v_GenNum.

Step 3840 creates v_GenNum number of new storage volumes on the specified storage device in the destination site for the new backup volumes and stores each storage volume ID to the array variable v_BackupVolumeIDs[ ].

Step 3850 initializes the variable v_Count to 0.

Step 3860 checks if all of the backup volumes have been created yet. If so then the process proceeds to step 4000, otherwise it proceeds to step 3870.

Step 3870 adds a new record to the storage volume table with the Storage Volume ID set to v_BackupVolumeIDs[v_Count], the VI Key ID created in step 3750, the specified storage device ID, the volume type set to "Backup", and the backup timestamp set to "null".

Step 3880 checks if v_Count+1 is less than v_GenNum. If so then the process proceeds to step 3890, otherwise it proceeds to step 3900.

Step 3890 sets the next generation volume ID of the newly added record in step 3870 to v_BackupVolumeIDs[v_Count+1] and proceeds to step 3910.

Step 3900 sets the next generation volume ID of the newly added record in step 3870 to v_BackupVolumeIDs[0].

Step 3910 sets the pair configuration between the primary volume created in step 3800 and the backup volume of v_BackupVolumeIDs[v_Count]. Then the process proceeds back to step 3860.

Steps 4000 to 4020 copies the latest data on the primary volume. Step 4000 selects the record from the storage volume table from which the VI Key ID was obtained in step 3740 and the volume type of "Primary". Then the storage volume ID and the storage device ID are obtained. Step 4010 sets the pair configuration between the storage volumes found in step 4000 and the ones created in step 3800. Step 4020 copies data content from the prior primary volume to the newly created primary volume on the migration target site.

Steps 4030 to 4040 registers catalog information for the prior primary volume since it now will be recognized as one of the backup volumes. Step 4030 sets the volume type to "Backup" and the current time for the backup timestamp to the record obtained in step 4000. Step 4040 adds the new record to the backup catalog table and sets a new backup ID, specified VI Rep. ID, backup timestamp as current time, archive timestamp as "null", and backup target with the storage volume ID of the record obtained in step 4000.

Steps 4050 to 4060 archives the oldest backup data since the previous primary volume has now been changed to a backup volume and thus the oldest backup volume might need to be archived and discarded. Step 4050 executes step 3030 to 3380 of FIG. 14 to archive the oldest backup volume if needed. Step 4060 executes step 3300 to 3380 of FIG. 16 to remove the unnecessary backup volume and virtual infrastructure if they exist.

Steps 4070 to 4090 clear the unused backup volumes if they exist in the migration source side of the virtual infrastructure. Due to frequent migrations, not every generation of backup volumes provisioned will necessarily be used. Step 4070 selects all the records from the storage volume table where the VI Key ID was obtained in 3740, the volume type is "Backup", and the backup timestamp is "null". Then the storage volume ID and the storage device ID are obtained. Step 4080 deletes all of the storage volumes from the storage device found in step 4070. Step 4090 deletes the record selected in step 4070.

Step 4100 lastly restarts the application or the virtual server. Step 4100 starts applications or the virtual server itself as found in step 3710.

FIG. 23 illustrates an example embodiment of a virtual infrastructure with a backup structure. As previously explained, data is archived to the globally accessible tape system or a similar archive device. The archive process itself is also performed by the Virtual Infrastructure Module on the management server. On the other hand, the actual backup, or the actual data copy from the primary volume to the backup volume, is done within a storage system or at least between the storage systems within the same site, thus it could be done very fast by using dedicated storage system replication functions. In contrast, the archive task was handled by the module on the management server and needed to process data byte by byte to transfer data to the archive device such as the tape system or other remote replication functions are needed. Hence it could take a long time and the workload of management server would be high. If data de-duping or encryption was done concurrently during the archive then the workload would be significant. In this embodiment, we equip the archive dedicated (virtual) server as part of the virtual infrastructure so that the workload from archiving can be offloaded to a respective server resource on each site instead of using the computing resource on the management server. Since some of the backup volumes are left on the migration source side of the virtual infrastructure in this invention, the archive server instance also needs to be maintained on the migration source side of the virtual infrastructure until every backup volume is discarded. Most of the components and behaviors are same as previously described, with some key differences.

FIG. 23 therefore illustrates an example embodiment of the virtual infrastructure components. An archive server is used on each virtual infrastructure as a backup environment. Now, the Virtual Infrastructure Management Module can just send the command to this instance to archive specific data instead of performing the archive process by itself. On the dynamic migration process in this embodiment, the new archive server instance 5010-2 will be provisioned on the migration target side of virtual infrastructure 5000-2. But it behaves differently than the virtual server which runs the application. The archive server 5010-1 on the migration source side of virtual infrastructure will not be removed even after the migration. Because some backup volumes are on that virtual infrastructure, it needs to be maintained for awhile after the migration.

FIG. 24 illustrates an example embodiment of a data structure of a virtual server table.

FIG. 24 shows an example data structure of the virtual server table 5100 of the virtual infrastructure embodiment of FIG. 23. It has an application type column to distinguish the application server and archive server instances.

The Virtual Server ID 5110 provides identification for a Virtual Server.

The Virtual Infrastructure Key ID 5120 provides a unique identification for the respective virtual infrastructures (for each virtual infrastructure after the migration).

The Physical Server ID 5130 provides identification for the physical server that hosts the virtual server or the archive server.

The Application Type 5140 indicates the type of the server instance whether application server or archive server.

For instance, line 5191 represents a record of a virtual server which runs applications that have "VSrv1" as the ID, belong to the virtual infrastructure "VI100", and wherein the physical server "PSrv1" hosts this virtual server. Line 5192 represents a record of an archive server with an application type of "Archive" and since it has same VI Key ID as the virtual server, both servers are therefore on the same virtual infrastructure.

In the embodiment illustrated in FIGS. 23 and 24, several steps are modified.

For the backup process of FIGS. 14 through 16, Step 3010 is modified to further add selection criteria of application type as "Production". Steps 3010 and 3210 is modified such that when archiving either the oldest or the latest data, the Virtual Infrastructure Management Module will just send a command to the archive server that is on the virtual infrastructure. To do so, it will need to get the archive server information from the virtual server table with the VI Key ID obtained from step 3000 or 3300.

For the restore process of FIGS. 17 through 19, Step 3640 is modified so that when restoring data from the archive device, the Virtual Infrastructure Management Module will just send a command to the archive server that is on the virtual infrastructure. To do so, it needs to get the archive server information from the virtual server table with the VI Key ID obtained from step 3540.

For the migration process of FIGS. 20 through 22, Step 3710 is modified to add the selection criteria of application type as "Production" to find the virtual server which runs the application. It will also select the archive server respectively where the application type is "archive". Step 3730 is modified so that in addition to the migration of the virtual server, a new instance of the archive server is created on the migration target side as well. However, the archive server instance on the migration source side will remain. Step 3760 is modified to add a new record for the created archive server in addition to updating information for the record of virtual server.

FIG. 25 illustrates another example embodiment of a virtual infrastructure with a backup structure. Previously, we have illustrated an embodiment wherein the primary volume on the migration source side is changed to one of the backup volumes. In the embodiment illustrated in FIG. 25, we demonstrate an alternative option in which the prior Primary Volume is not used as the latest Backup Volume, but rather is simply discarded after the data has copied to the migration target side.

FIG. 25 shows an example of the virtual infrastructure components of this embodiment. After the migration is completed, the previous primary volume 5200 in the migration source side of the virtual infrastructure 600-1 is discarded (the latest data content has been copied to the new primary volume 630 during the migration process, thus it's not lost). Also since the previous primary volume is not used as a backup volume in this embodiment, backup volume 5210 (which holds the oldest backup data) is not discarded during the migration process. In previous embodiments, the periodical backup process can be aligned to the time that migration process has occurred. But in this embodiment, the timing of the backup process will be continued.

For this embodiment, the backup and restore process will remain the same as the previous embodiment. However in the migration process, the steps of registering previous primary volume information to the backup catalog table and removing the oldest backup volume are no longer needed. Therefore steps 4030 to 4060 in FIGS. 20 to 22 are discarded for this embodiment.

FIG. 26 is a block diagram that illustrates an embodiment of a computer/server system 2600 upon which an embodiment of the inventive methodology may be implemented. The system 2600 includes a computer/server platform 2601, peripheral devices 2602 and network resources 2603.

The computer platform 2601 may include a data bus 2604 or other communication mechanism for communicating information across and among various parts of the computer platform 2601, and a processor 2605 coupled with bus 2601 for processing information and performing other computational and control tasks. Computer platform 2601 also includes a volatile storage 2606, such as a random access memory (RAM) or other dynamic storage device, coupled to bus 2604 for storing various information as well as instructions to be executed by processor 2605. The volatile storage 2606 also may be used for storing temporary variables or other intermediate information during execution of instructions by processor 2605. Computer platform 2601 may further include a read only memory (ROM or EPROM) 2607 or other static storage device coupled to bus 2604 for storing static information and instructions for processor 2605, such as basic input-output system (BIOS), as well as various system configuration parameters. A persistent storage device 2608, such as a magnetic disk, optical disk, or solid-state flash memory device is provided and coupled to bus 2601 for storing information and instructions.

Computer platform 2601 may be coupled via bus 2604 to a display 2609, such as a cathode ray tube (CRT), plasma display, or a liquid crystal display (LCD), for displaying information to a system administrator or user of the computer platform 2601. An input device 2610, including alphanumeric and other keys, is coupled to bus 2601 for communicating information and command selections to processor 2605. Another type of user input device is cursor control device 2611, such as a mouse, a trackball, or cursor direction keys for communicating direction information and command selections to processor 2604 and for controlling cursor movement on display 2609. This input device typically has two degrees of freedom in two axes, a first axis (e.g., x) and a second axis (e.g., y), that allows the device to specify positions in a plane.

An external storage device 2612 may be coupled to the computer platform 2601 via bus 2604 to provide an extra or removable storage capacity for the computer platform 2601. In an embodiment of the computer system 2600, the external removable storage device 2612 may be used to facilitate exchange of data with other computer systems.

The invention is related to the use of computer system 2600 for implementing the techniques described herein. In an embodiment, the inventive system may reside on a machine such as computer platform 2601. According to one embodiment of the invention, the techniques described herein are performed by computer system 2600 in response to processor 2605 executing one or more sequences of one or more instructions contained in the volatile memory 2606. Such instructions may be read into volatile memory 2606 from another computer-readable medium, such as persistent storage device 2608. Execution of the sequences of instructions contained in the volatile memory 2606 causes processor 2605 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 2605 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 2608. Volatile media includes dynamic memory, such as volatile storage 2606.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 2605 for execution. For example, the instructions may initially be carried on a magnetic disk from a remote computer. Alternatively, a remote computer can load the instructions into its dynamic memory and send the instructions over a telephone line using a modem. A modem local to computer system 2600 can receive the data on the telephone line and use an infra-red transmitter to convert the data to an infra-red signal. An infra-red detector can receive the data carried in the infra-red signal and appropriate circuitry can place the data on the data bus 2604. The bus 2604 carries the data to the volatile storage 2606, from which processor 2605 retrieves and executes the instructions. The instructions received by the volatile memory 2606 may optionally be stored on persistent storage device 2608 either before or after execution by processor 2605. The instructions may also be downloaded into the computer platform 2601 via Internet using a variety of network data communication protocols well known in the art.

The computer platform 2601 also includes a communication interface, such as network interface card 2613 coupled to the data bus 2604. Communication interface 2613 provides a two-way data communication coupling to a network link 2614 that is coupled to a local network 2615. For example, communication interface 2613 may be an integrated services digital network (ISDN) card or a modem to provide a data communication connection to a corresponding type of telephone line. As another example, communication interface 2613 may be a local area network interface card (LAN NIC) to provide a data communication connection to a compatible LAN. Wireless links, such as well-known 802.11a, 802.11b, 802.11g and Bluetooth may also be used for network implementation. In any such implementation, communication interface 2613 sends and receives electrical, electromagnetic or optical signals that carry digital data streams representing various types of information.

Network link 2613 typically provides data communication through one or more networks to other network resources. For example, network link 2614 may provide a connection through local network 2615 to a host computer 2616, or a network storage/server 2617. Additionally or alternatively, the network link 2613 may connect through gateway/firewall 2617 to the wide-area or global network 2618, such as an Internet. Thus, the computer platform 2601 can access network resources located anywhere on the Internet 2618, such as a remote network storage/server 2619. On the other hand, the computer platform 2601 may also be accessed by clients located anywhere on the local area network 2615 and/or the Internet 2618. The network clients 2620 and 2621 may themselves be implemented based on the computer platform similar to the platform 2601.

Local network 2615 and the Internet 2618 both use electrical, electromagnetic or optical signals that carry digital data streams. The signals through the various networks and the signals on network link 2614 and through communication interface 2613, which carry the digital data to and from computer platform 2601, are exemplary forms of carrier waves transporting the information.

Computer platform 2601 can send messages and receive data, including program code, through the variety of network(s) including Internet 2618 and LAN 2615, network link 2614 and communication interface 2613. In the Internet example, when the system 2601 acts as a network server, it might transmit a requested code or data for an application program running on client(s) 2620 and/or 2621 through Internet 2618, gateway/firewall 2617, local area network 2615 and communication interface 2613. Similarly, it may receive code from other network resources.

The received code may be executed by processor 2605 as it is received, and/or stored in persistent or volatile storage devices 2608 and 2606, respectively, or other non-volatile storage for later execution. In this manner, computer system 2601 may obtain application code in the form of a carrier wave.

It should be noted that the present invention is not limited to any specific firewall system. The inventive policy-based content processing system may be used in any of the three firewall operating modes and specifically NAT, routed and transparent.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the data backup system and methods for virtual infrastructure. It is intended that the specification and examples be considered as exemplary only, with a true scope and spirit of the invention being indicated by the following claims.

What is claimed is:

1. A system, comprising:
a plurality of storage systems forming a virtualized storage pool, each of the plurality of storage systems comprising a controller and a plurality of storage devices and each of the plurality of storage systems managing one or more logical volumes provided with the plurality of storage devices, and
a management server managing the virtualized storage pool,
wherein a first storage system of the plurality of storage systems comprises a first backup logical volume of a primary logical volume at a first timing, wherein a second storage system of the plurality of storage systems comprises the primary logical volume and a second backup logical volume of the primary logical volume at a second timing after the first timing;
wherein either the management server or at least one storage system of the plurality of storage systems manages generation information of the first backup logical volume and the second backup logical volume;
wherein the first backup logical volume in the first storage system is adapted to be used for restoring data of the primary logical volume in the second storage system.

2. The system of claim 1, further comprising a source side virtual infrastructure, comprising:
a virtual server allocated from a server resource pool; and
the primary logical volume; and,
a plurality of backup logical volumes allocated from the virtualized storage pool.

3. The system of claim 2, wherein the management server further comprises:
a backup catalog comprising a record of data backups; and
a virtual infrastructure management module configured to periodically store the generation information comprising generations of backup data, and to cyclically overwrite a number of the plurality of backup logical volumes based on how many backup logical volumes are in the plurality of backup logical volumes.

4. The system of claim 3, wherein the virtual infrastructure management module is further configured to:
generate the primary logical volume and an equal number of generations of the plurality of backup logical volumes in the source side virtual infrastructure to be available for use in a target side virtual infrastructure; and migrate the virtual server from the source side virtual infrastructure to the target side virtual infrastructure.

5. The system of claim 4, wherein the virtual infrastructure management module is further configured to:
copy data in the primary logical volume from the source side virtual infrastructure to the target side virtual infrastructure; and
utilize the backup catalog to render the plurality of backup logical volumes in the source side virtual infrastructure to be accessible after the virtual server is migrated.

6. The system of claim 4, wherein the virtual infrastructure management module is further configured to:
convert the primary logical volume in the source side virtual infrastructure to a backup logical volume representing a latest generation of backup data; and
discard the backup logical volume from the plurality of backup logical volumes representing an oldest generation of backup data.

7. The system of claim 4, wherein the virtual infrastructure management module is further configured to discard the primary logical volume in the source side virtual infrastructure.

8. A management server managing a virtualized storage pool, comprising:
a backup catalog comprising a record of data backups; and
a virtual infrastructure management module configured to periodically store generation information comprising generations of backup data and a virtual infrastructure ID indicating a virtual infrastructure holding the backup data,
wherein the management server is operable to utilize a first backup logical volume held in a first virtual infrastructure, for restoring data of a primary logical volume based on the generation information of the first backup logical volume.

9. The management server of claim 8, wherein the virtual infrastructure management module is further configured to:
generate the primary logical volume and an equal number of generations of the plurality of backup logical volumes in a source side virtual infrastructure to be available for use in a target side virtual infrastructure; and
migrate a virtual server from the source side virtual infrastructure to the target side virtual infrastructure.

10. The system of claim 9, wherein the virtual infrastructure management module is further configured to:
copy data in the primary logical volume from the source side virtual infrastructure to the target side virtual infrastructure; and
utilize the backup catalog to render the plurality of backup logical volumes in the source side virtual infrastructure to be accessible after the virtual server is migrated.

11. The system of claim 9, wherein the virtual infrastructure management module is further configured to:
convert the primary logical volume in the source side virtual infrastructure to a backup logical volume representing a latest generation of backup data; and
discard, from the plurality of backup logical volumes, a backup logical volume representing an oldest generation of backup data.

12. The management server of claim 9, wherein the virtual infrastructure management module is further configured to discard the primary logical volume in the source side virtual infrastructure.

13. The management server of claim 8, wherein the virtual infrastructure management module is configured to cyclically overwrite a number of the plurality of backup logical volumes based on how many backup logical volumes are in a plurality of backup logical volumes.

14. A system, comprising:
a plurality of storage systems forming a virtualized storage pool, each of the plurality of storage systems comprising a controller and a plurality of storage devices and each of the plurality of storage systems managing one or more logical volumes provided with the plurality of storage devices;
wherein a first storage system of the plurality of storage systems comprises a first backup logical volume of a primary logical volume at a first timing, wherein a second storage system of the plurality of storage systems comprises the primary logical volume and a second backup logical volume of the primary logical volume at a second timing after the first timing;
wherein either the management server or at least one storage system of the plurality of storage systems manages generation information of the first backup logical volume and the second backup logical volume;
wherein the first backup logical volume in the first storage system is adapted to be used for restoring data of the primary logical volume in the second storage system.

15. The system of claim 14, further comprising a source side virtual infrastructure, comprising:
a virtual server allocated from a server resource pool; and
the primary logical volume; and,
a plurality of backup logical volumes allocated from the virtualized storage pool.

16. The system of claim 15, wherein a number of the plurality of backup logical volumes are cyclically overwritten based on how many backup logical volumes are in the plurality of backup logical volumes.

17. The system of claim 15, where the primary logical volume and an equal number of generations of backup logical volumes are generated in the source side virtual infrastructure to be available for use in a target side virtual infrastructure; and
wherein the virtual server is migrated from the source side virtual infrastructure to a target virtual infrastructure.

18. The system of claim 17, wherein data in the primary logical volume is copied from the source side virtual infrastructure to the target side virtual infrastructure; and
wherein a backup catalog is utilized to maintain the plurality of backup logical volumes in the source side virtual infrastructure to render the plurality of backup logical volumes in the source side virtual infrastructure to be accessible after the virtual server is migrated.

19. The system of claim 17, wherein the primary logical volume is converted in the source side virtual infrastructure to a backup logical volume representing a latest generation of backup data; and
wherein a backup logical volume of the plurality of logical volumes representing the oldest generation of backup data is discarded.

20. The system of claim 17, wherein the primary logical volume is discarded from the source side virtual infrastructure after the copying.

* * * * *